United States Patent
Caute et al.

(10) Patent No.: US 9,772,417 B2
(45) Date of Patent: Sep. 26, 2017

(54) MULTI-FUNCTION BROADBAND PHASED-ARRAY SOFTWARE DEFINED SONAR SYSTEM AND METHOD

(71) Applicant: Airmar Technology Corporation, Milford, NH (US)

(72) Inventors: Didier Caute, Ploemeur (FR); Oskar Axelsson, Reykjavik (IS); Karl Kenny, St. John's (CA)

(73) Assignee: AIRMAR TECHNOLOGY CORPORATION, Milford, NH (US)

( * ) Notice: Subject to any disclaimer, the term of this patent is extended or adjusted under 35 U.S.C. 154(b) by 0 days.

(21) Appl. No.: 14/809,964

(22) Filed: Jul. 27, 2015

(65) Prior Publication Data
US 2016/0216392 A1 Jul. 28, 2016

Related U.S. Application Data

(63) Continuation of application No. 13/026,036, filed on Feb. 11, 2011, now Pat. No. 9,091,790, which is a continuation of application No. PCT/CA2009/001118, filed on Aug. 11, 2009.

(60) Provisional application No. 61/087,758, filed on Aug. 11, 2008.

(51) Int. Cl.
| G06F 19/00 | (2011.01) |
| G01V 1/38 | (2006.01) |
| G01S 7/00 | (2006.01) |
| G01S 7/521 | (2006.01) |
| G01S 15/02 | (2006.01) |

(52) U.S. Cl.
CPC .............. *G01V 1/38* (2013.01); *G01S 7/003* (2013.01); *G01S 7/521* (2013.01); *G01S 15/02* (2013.01)

(58) Field of Classification Search
CPC .. C12C 1/6869; C12C 1/6874; A61K 2300/00
USPC .......................................... 702/14, 182–185
See application file for complete search history.

(56) References Cited

U.S. PATENT DOCUMENTS

| 3,775,734 A | 11/1973 | Bealor, Jr. et al. |
| 4,138,669 A | 2/1979 | Edison et al. |
| 4,439,847 A | 3/1984 | Massa |
| 5,099,458 A | 3/1992 | Takaki |

(Continued)

FOREIGN PATENT DOCUMENTS

| EP | 0553053 A2 | 7/1993 |
| EP | 1522921 A1 | 4/2005 |

(Continued)

OTHER PUBLICATIONS

Acker, W., et al., "The Digital Transducer, New Sonar Technology," pp. 403-404, *IEEE*, (Jun. 1998).

(Continued)

*Primary Examiner* — Edward Raymond
(74) *Attorney, Agent, or Firm* — Hamilton, Brook, Smith & Reynolds, P.C.

(57) ABSTRACT

A software defined platform is provided for subsea acoustic applications that utilizes a broadband phased array transducer and a configurable, multi-function software defined transducer that is configurable on the fly to enable various subsea acoustic systems to be achieved in a single unit thus reducing the space required on the vessel and the cost of having such multiple functions.

17 Claims, 28 Drawing Sheets

(56) References Cited

U.S. PATENT DOCUMENTS

| | | |
|---|---|---|
| 5,181,135 A | 1/1993 | Keeler |
| 5,208,785 A | 5/1993 | Brumley et al. |
| 5,559,756 A | 9/1996 | Connolly |
| RE35,535 E | 6/1997 | Brumley et al. |
| 6,052,600 A | 4/2000 | Fette et al. |
| 6,130,641 A | 10/2000 | Kraeutner et al. |
| 6,130,859 A | 10/2000 | Sonnenschein et al. |
| 6,667,934 B1 | 12/2003 | Healey |
| 6,823,181 B1 | 11/2004 | Kohno et al. |
| 6,876,864 B1 | 4/2005 | Chapin |
| 7,007,155 B2 | 2/2006 | Mohebbi et al. |
| 7,043,023 B2 | 5/2006 | Watanabe et al. |
| 7,123,162 B2 | 10/2006 | Mackenzie et al. |
| 7,151,925 B2 | 12/2006 | Ting et al. |
| 7,310,286 B1 | 12/2007 | Jarvis et al. |
| 7,328,741 B2 | 2/2008 | Allen et al. |
| 7,346,330 B2 | 3/2008 | Kawabe et al. |
| 7,364,007 B2 | 4/2008 | Garcia-Osuna et al. |
| 9,091,790 B2 | 7/2015 | Caute et al. |
| 2001/0014603 A1 | 8/2001 | Bucknell et al. |
| 2002/0144134 A1 | 10/2002 | Watanabe et al. |
| 2002/0158814 A1 | 10/2002 | Bright et al. |
| 2003/0231117 A1 | 12/2003 | Schultz et al. |
| 2004/0039282 A1 | 2/2004 | Szabo et al. |
| 2004/0240628 A1 | 12/2004 | Hayashi |
| 2005/0059427 A1 | 3/2005 | Wallace |
| 2005/0111346 A1 | 5/2005 | Santhoff et al. |
| 2006/0045212 A1 | 3/2006 | Ishii et al. |
| 2006/0052094 A1 | 3/2006 | Kawabe et al. |
| 2006/0164919 A1 | 7/2006 | Watanabe et al. |
| 2006/0234691 A1 | 10/2006 | Dygert |
| 2006/0253415 A1 | 11/2006 | Chakraborty et al. |
| 2006/0282497 A1 | 12/2006 | Braun et al. |
| 2007/0070814 A1 | 3/2007 | Frodyma |
| 2007/0133387 A1 | 6/2007 | Arslan et al. |
| 2007/0190994 A1 | 8/2007 | Sakai et al. |
| 2008/0110261 A1 | 5/2008 | Randall |
| 2010/0061187 A1* | 3/2010 | Sodal .................. G01S 5/22 367/131 |
| 2010/0134319 A1 | 6/2010 | Rhodes et al. |
| 2016/0011326 A1 | 1/2016 | Caute et al. |

FOREIGN PATENT DOCUMENTS

| | | |
|---|---|---|
| GB | 2 388 901 A | 11/2003 |
| WO | WO 02/44761 A2 | 6/2002 |
| WO | WO 2009/055918 A1 | 5/2009 |
| WO | WO 2010/017629 A1 | 2/2010 |
| WO | WO 2011/063515 A1 | 6/2011 |

OTHER PUBLICATIONS

Graham, P. and Nelson, B., "Frequency-Domain Sonar Processing in FPGAs and DSPs," Brigham Young University, 2 pgs., published in FCCM '98 Proceedings of the IEEE Symposium on FPGAs for Custom Computing Machines, (1998).

Media Release, "Marport Announces Subsea Data Acquisition System," London, U.K., pp. 1-3, Mar. 13, 2008.

Jones, E., "The Use of the Software Communications Architecture (SCA) for Sonar and Underwater Communication Applications," *Proceeding of the SDR 06 Technical Conference and Product Exposition*, pp. 1-6, (2006).

"An Introduction to Broadband Transducer Performance," *The Sounder*, Airmar Technology Corporation, bi-monthly newsletter, 3 pgs. (2005).

South, H., et al., "Technologies for Sonar Processing," Johns Hopkins APL Technical Digest, vol. 19, No. 4, pp. 459-469 (1998).

Land, L., "Adaptive Beam Forming Techniques in Software," COTS Journal, pp. 1-5, (Jan. 2003).

Graham, P., and Nelson, B., FPGA-Based Sonar Processing, Brigham Young University, Proceedings of the Sixth ACM/SIGDA International Symposium on Field-Programmable Gate Arrays pp. 201-208, ACM/SIGDA, ACM (1998).

rModem: main/home page http://seagrant.mit.edu/rModem/phpweb/pmwiki.php?n=Main.HomePage (2 pgs.).

News Release transmitted by CCNMatthews for Spectrum Signal Processing, "Spectrum Signal Processing to Assist Thales Underwater Systems in Mine Detection From an Unmanned Underwater Vehicle," 3 pgs. (Sep. 2003).

Jurdak, R., et al., "Software Modems for Underwater Sensor Networks," University College Dublin, published in Oceans 2007—Europe, IEEE, (Jun. 18-21, 2007).

Kastner, R., Department of Electrical and Computer Engineering, University of California, Santa Barbara, "Reconfigurable Computing Architectures," 16 pgs. (Nov. 2005).

Spectrum Signal Processing by Vecima, "The flexComm Advantage for Radar and Sonar Applications," 2 pgs. (2007).

Fu, T., et al., "Design and Development of a Software-Defined Underwater Acoustic Modem for Sensor Networks for Environmental and Ecological Research," IEEE, 6 pgs. (2006).

EPO Search Report for EP 09806264.9, date of mailing Jun. 1, 2012.

International Preliminary Report on Patentability and Written Opinion for PCT/CA2009/001118, date of mailing Feb. 15, 2011.

Media Release "Marport Announces Software Defined Sonar Technology Platform," St. Johns Newfoundland, pp. 1-3, Sep. 25, 2007.

Jones, E., "The Application of Software Radio Techniques to Underwater Acoustic Communications," IEEE abstract, 1 pg. (Jun. 2007).

Prasad, S.E., "Deployable Sonar Systems for Underwater Communications," Sensor Technology Limited, International Conference on Sonar-Sensors & Systems; ICONS, published by Allied Publishers, 8 pgs. (2002).

International Search Report and Written Opinion for PCT/CA09/01118, entitled: Multi-Function Broadband Phased-Array Software Defined Sonar System and Method, mailed Dec. 22, 2009 (11 pages).

Kastner, R., "AquaNode: A Solution for Wireless Underwater Communication," Creon & Gleon Workshop, Department of Electrical and Computer Engineering, University of California, 26 pgs., Mar. 30, 2006.

Iltis, R., et al., "An Underwater Acoustic Telemetry Modem for Eco-Sensing," Department of Electrical and Computer Engineering, University of California, pp. 1-30, in Proc. MTS/IEEE Oceans, Washington, D.C., 2005.

Aquamodem Design Specifications, U.C. Santa Barbara College of Engineering, www.aquanode.ucsb.edu/aquamodem/ , Jun. 27, 2005.

"Radar System Using High-Performance Signal Processing Solutions," Radar/Sonar: Software Defined Solutions from Spectrum Signal Processing, Feb. 13, 2015.

Furuno, Installation Manual Color LCD Sounder, FCV-1200L/FCV-1200LM—Installation Manual; www.furuno.co.jp. Jun. 18, 2007.

Furuno, Operator's Manual—Color LCD Sounder, Model FCV-1200L/1200LM, Jun. 21, 2007.

\* cited by examiner

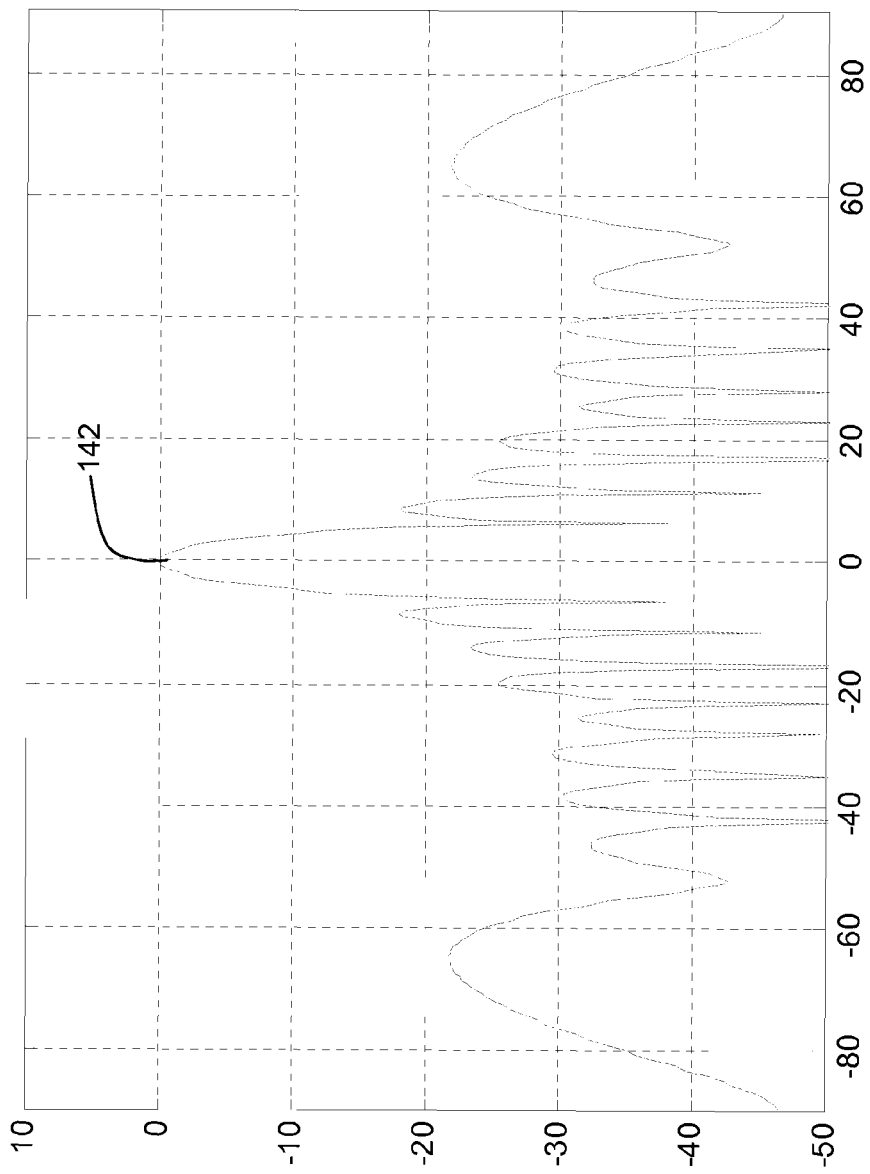
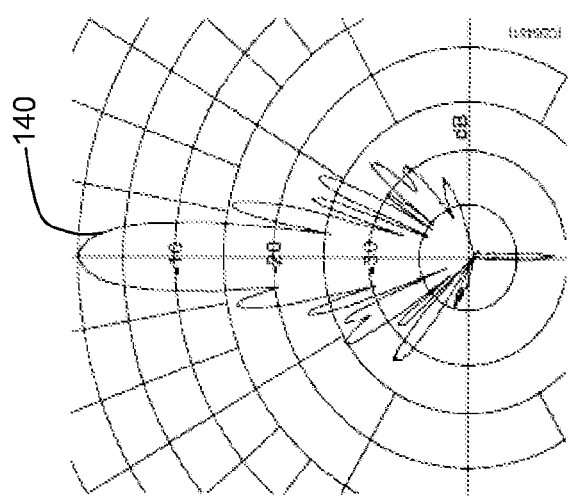
Figure 11

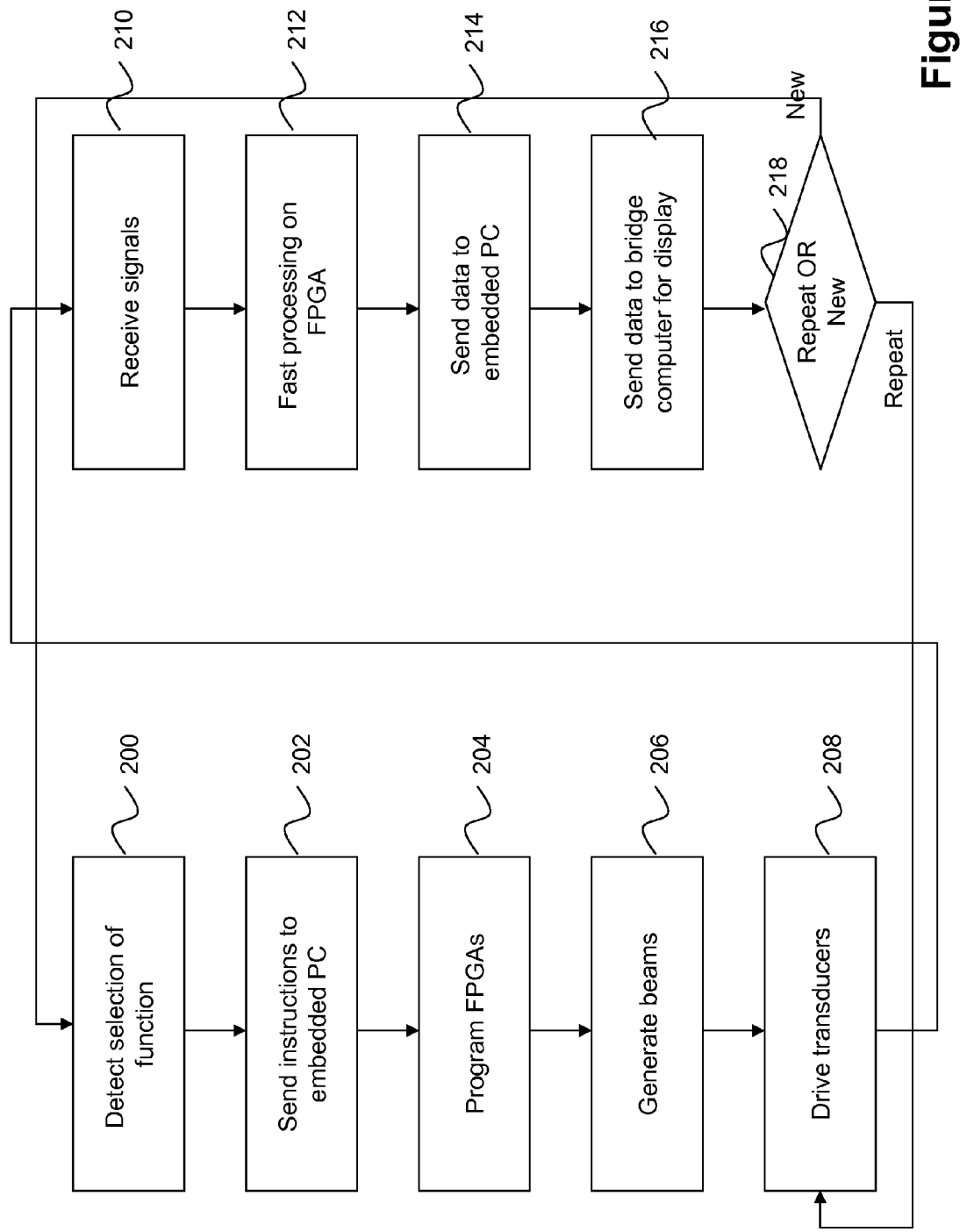

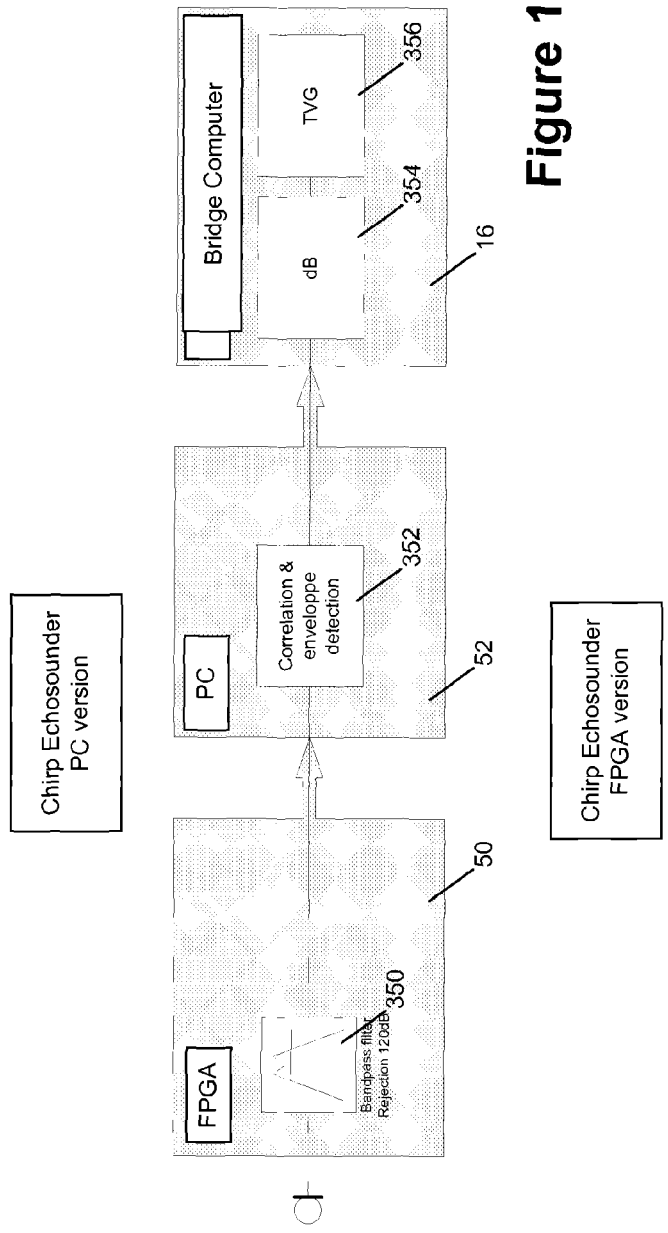
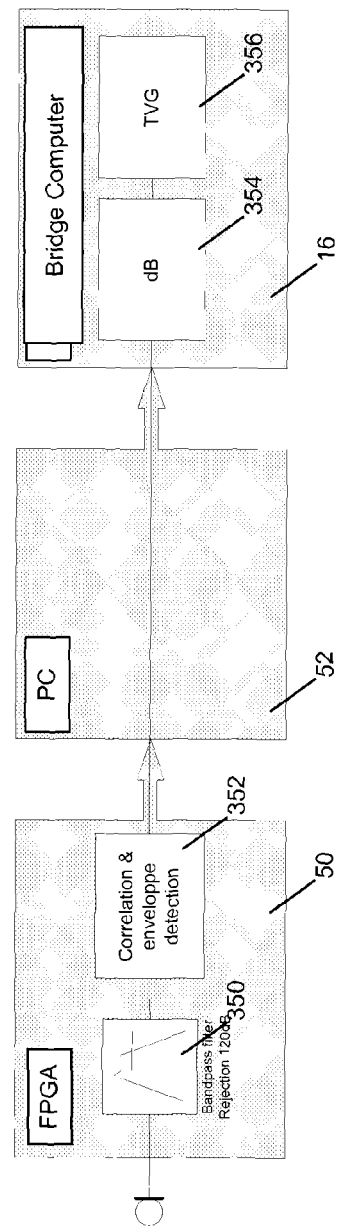

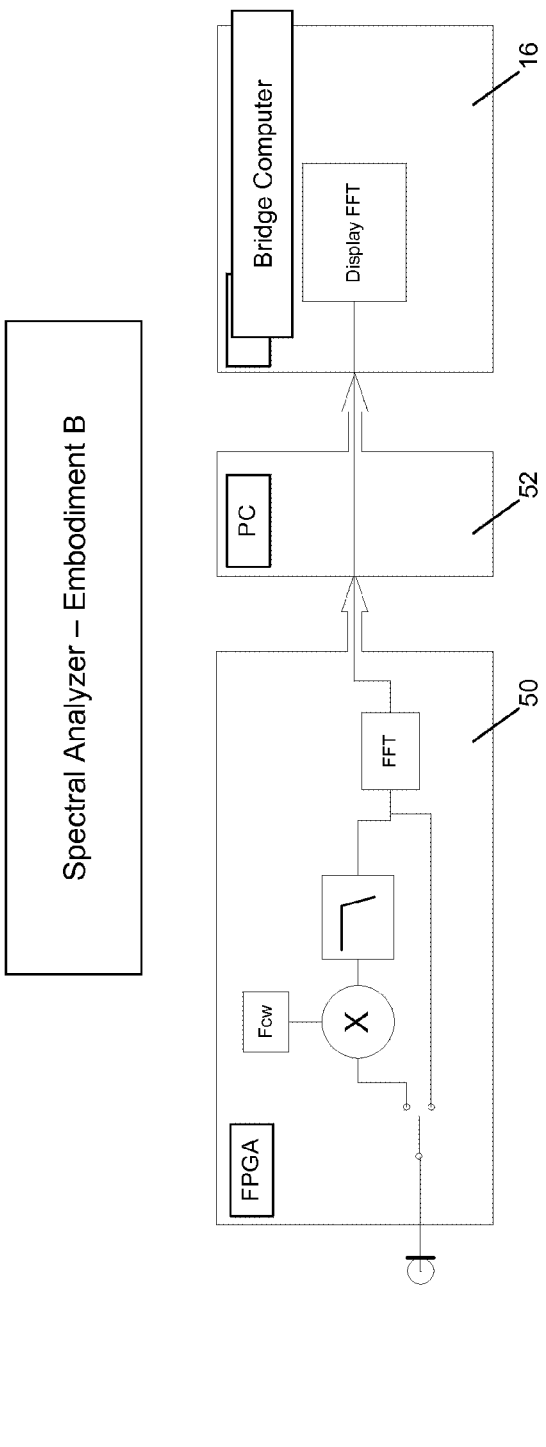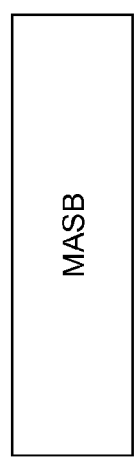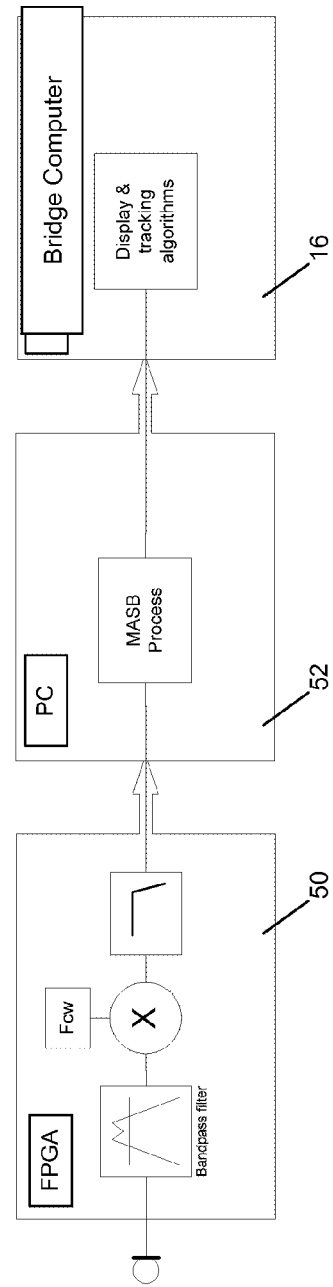
Figure 27
Figure 28

MULTI-FUNCTION BROADBAND PHASED-ARRAY SOFTWARE DEFINED SONAR SYSTEM AND METHOD

RELATED APPLICATIONS

This application is a continuation of U.S. application Ser. No. 13/026,036, filed Feb. 11, 2011, which is a continuation of PCT Application No. PCT/CA2009/001118 filed on Aug. 11, 2009 which claims priority from U.S. Provisional Patent Application No. 61/087,758 filed on Aug. 11, 2008, the contents of which are incorporated herein by reference.

FIELD OF THE INVENTION

The following relates generally to subsea acoustics and has particular utility in performing multiple acoustic functions using a common software defined platform.

BACKGROUND

Subsea acoustics technology, e.g. sonar, has been used for many years in facilitating underwater navigation, exploration, sensing and communications and it is often desirable to have several acoustic systems such as a split-beam echosounder, sub-bottom profiler, Doppler profiler, to name a few; in order to perform the various specific functions. Traditionally, each subsea acoustic system requires its own fixed software and hardware components as well as its own physical space on the vessel. In addition, each system can cost tens of thousands of dollars to purchase and thus having multiple acoustic systems in a single vessel can become prohibitively expensive, in particular for smaller vessels or non-commercial vessels.

It is an object of the following to address the above-noted disadvantages.

SUMMARY

It has been found that by utilizing a software defined platform with a broadband phased array transducer, a configurable, multi-function sonar system can be provided to enable various subsea acoustic systems to be achieved in a single configurable unit thus reducing the space required on the vessel and the cost of having such multiple functions.

In one aspect, there is provided a system for performing multiple subsea acoustic applications comprising: a broadband phased array transducer comprising a plurality of transducer elements operated by a configurable software defined transceiver, the transceiver comprising at least one programmable device capable of being configured via software instructions and a plurality of channels corresponding to the transducer elements controlled by at least one transmit/receive switch to route the channels to respective ones of the transducer elements according to a selected one of the applications.

In another aspect, there is provided a method for dynamically performing one of a plurality of subsea acoustic applications using a common software defined sonar platform, the method comprising: detecting selection of a desired one of the subsea acoustic applications; providing instructions for implementing the desired application; programming at least one programmable device using the instructions to configure a transceiver to control a plurality of channels for corresponding transducer elements to route signals on the channels to respective ones of the transducer elements according to signal processing required for the desired application and obtain signals received by the transducer elements.

In yet another aspect, there is provided a computer readable medium comprising one or more sets of computer executable instructions for dynamically performing one of a plurality of subsea acoustic applications using a common software defined sonar platform, the one or more sets of computer executable instructions comprising instructions for implementing the method described above.

In yet another aspect, there is provided a software defined sonar transceiver for dynamically performing one of a plurality of subsea acoustic applications, the transceiver comprising: a power supply; a communicable connection to an external computing device for receiving instructions for a selected one of the acoustic applications; one or more communicable connections to corresponding transducer elements for providing signals thereto in performance of the acoustic applications; an embedded computer for receiving the instructions; at least one programmable device to be dynamically programmed by the embedded computer according to the instructions; at least one transmit channel comprising signal processing elements for generating a signal to be transmitted using the one or more transducers; at least one receive channel comprising signal processing elements for processing incoming signals received by the one or more transducers; and a transmit/receive switch for controlling the routing of transmit and receive signals.

In yet another aspect, there is provided a broadband transducer array for transmitting and receiving acoustic signals for a software defined sonar transceiver, the transducer array comprising one or more transducer elements each having a communicable connection for the transceiver; and a sensor module, the sensor module comprising one or more sensors for monitoring environmental conditions surrounding the transducer array, the one or more sensors comprising at least one position monitoring sensor for providing information to the transceiver to control signals to be sent via the transducer array to compensate for movement of the transducer array.

In yet another aspect, there is provided a software defined sonar transceiver for dynamically performing one of a plurality of subsea acoustic applications, the transceiver comprising a stack of a plurality of units each having each having a field programmable gate array (FPGA) and transmit and receive channels to create enough channels to accommodate the number of transducer elements comprised by a broadband transducer array to be operated by the transceiver, one of the units comprising a single clock source shared by all of the units to create a master/slave relationship to enable a master FPGA to synchronize transmit and receive operations for every channel.

BRIEF DESCRIPTION OF THE DRAWINGS

Embodiments will now be described by way of example only with reference to the appended drawings wherein:

FIGS. 11(a) and 11(b) show a simulated directivity pattern for the array shown in FIG. 9.

FIG. 18 is a flow chart illustrating an exemplary set of operations for configuring the system to perform a selected option.

FIG. 19 is a block diagram showing an exemplary configuration for a chirp echosounder function providing correlation and envelope detection on the embedded PC.

FIG. 20 is a block diagram showing an exemplary configuration for a chirp echosounder function providing correlation and envelope detection on the FPGA.

FIG. 27 is a block diagram illustrating another embodiment for implementing a spectral analyzer function.

FIG. 28 is a block diagram illustrating an exemplary configuration for performing a multi angle swath bathymetry (MASB) function.

DETAILED DESCRIPTION

As noted above, it has been found that by utilizing a software defined platform with a broadband phased array transducer, a configurable, multi-function sonar system can be provided to enable various subsea acoustic systems to be achieved in a single configurable unit thus reducing the space required on the vessel and the cost of having such multiple functions.

The system described below mitigates the need for fixed software and hardware embodied in separate units for performing multiple subsea acoustic functions by providing a configurable software defined platform that facilitates "on-the-fly" flexibility with a common set of hardware. The software defined platform operates in conjunction with a broadband phased array transducer in order to provide a broadband of frequencies to accommodate various functions such as a split beam sounder, Doppler profiler, sub bottom profiler and many more. The array utilizes a large set of individual transducer elements to enable dynamic beam-forming, beam-splitting, and beam-steering for long-range detection of targets and currents. Also provided is a sensor module that may be situated directly in/on the transducer array to provide beam-stabilization using direct feedback obtained from the actual movements of the array. In this way, the system can adapt to and compensate for changing environments.

Figure 1:
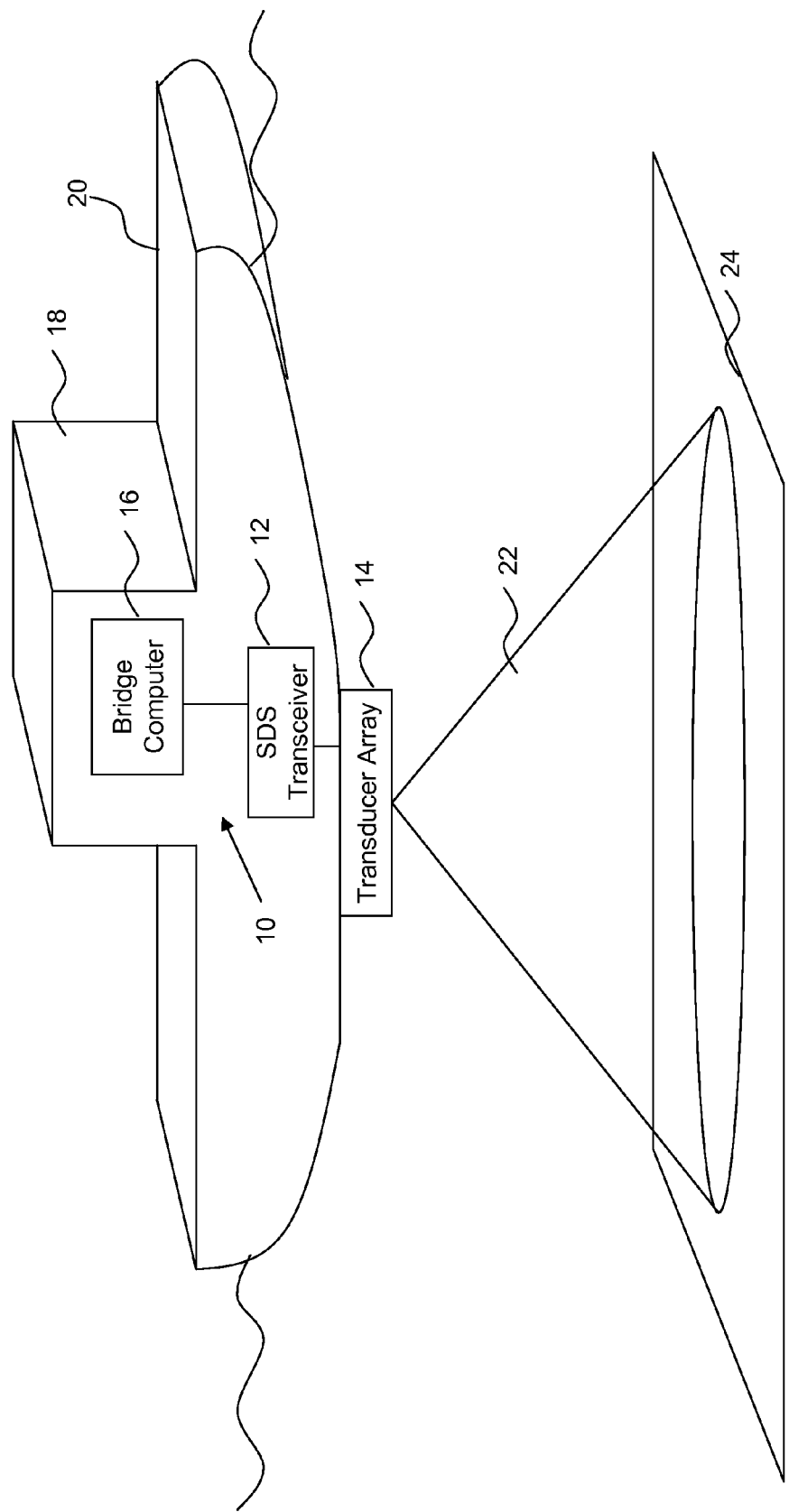
FIG. 1 is a schematic block diagram of a multi-function broadband phased array software defined sonar system shown in situ on a marine vessel.

Turning now to FIG. 1, a multi-function broadband phased array software defined sonar system is generally denoted by numeral 10 and will hereinafter be referred to as the "system 10". The system 10 comprises a software defined sonar (SDS) transceiver 12 connected to a broadband phased array transducer 14 and a bridge computer 16 that is typically situated on the bridge 18 of a marine vessel 20. In this example, the transducer array 14 is driven by the SDS transceiver 12, which is controlled by a user on the bridge 18 (or elsewhere) by the bridge computer 16. It will be appreciated that the SDS transceiver 12 can also be configured to be controlled remotely and need not always be operated from directly onboard the vessel 20. In FIG. 1, the transducer array 14 generates a beam 22 directed at the seafloor 24. As discussed later, it will be appreciated that the transducer array 14 is capable of generating a plurality of beams 22 for implementing different subsea acoustic functions.

Figure 2:
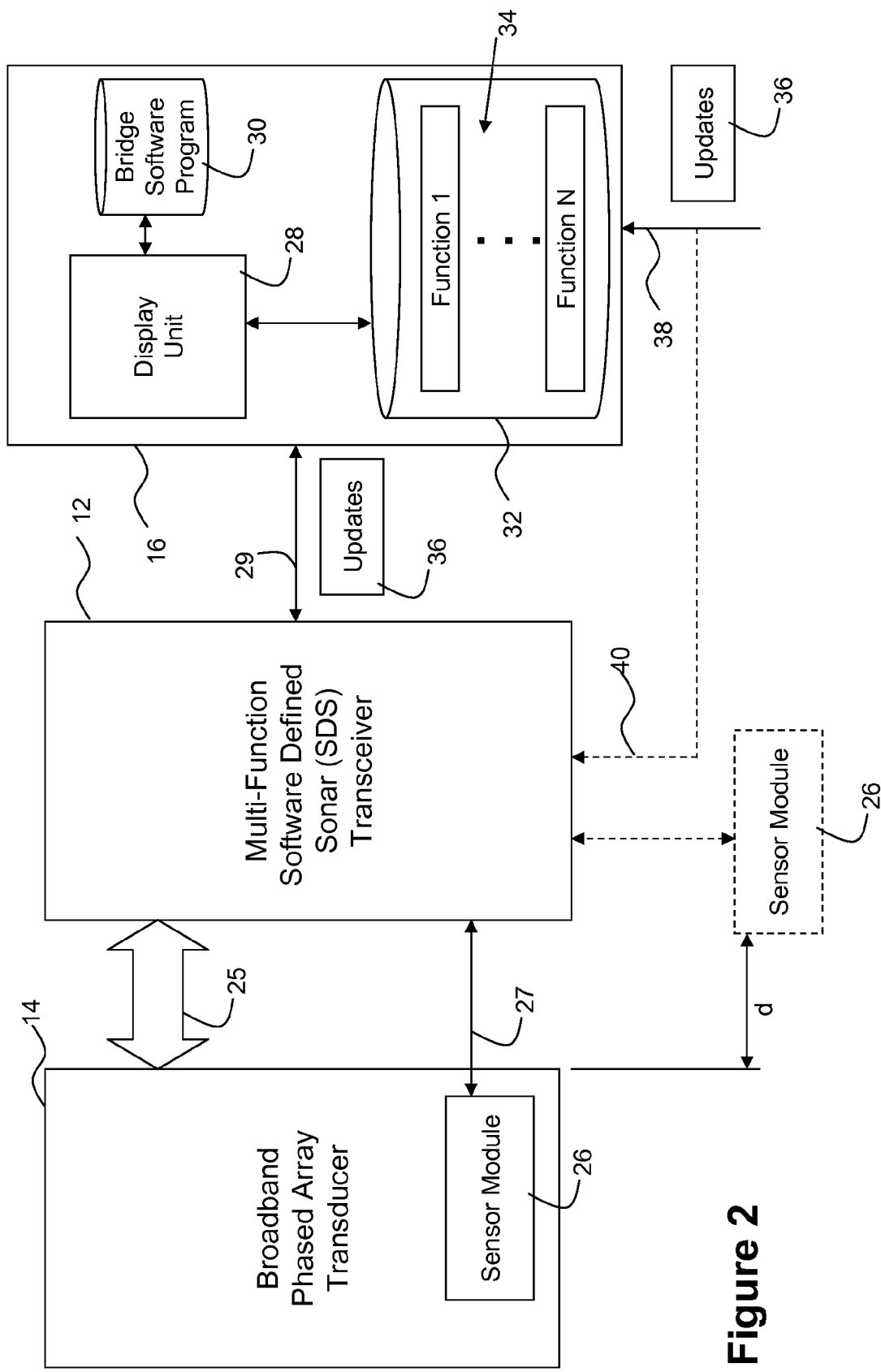
FIG. 2 is a schematic block diagram showing further detail of the system shown in FIG. 1.

FIG. 2 provides further detail of the system 10. The transducer array 14 comprises a sensor module 26 for measuring the pitch and roll of the transducer 14 and various other parameters of the water in which the transducer array 14 is submerged as will be explained in greater detail later. By incorporating the sensor module 26 directly into the transducer array 14, the actual environmental conditions, e.g. the actual pitch and roll of the transducer array 14, can be obtained while inhibiting bias associated with calculations based on the vessel 20 such as scenarios where the center of gravity of the vessel 20 is used but may vary based on the load of the vessel 20 and other factors (i.e. can fluctuate over time). As shown in FIG. 2 in dashed lines, the sensor module 26 may also be installed outside of the transducer array 14, in which case, the distance between the sensor module 26 and the transducer array 14 (*d*) would be required to compensate for a different center of gravity. In this example, the sensor module 26 is connected to the SDS transceiver 12 via a serial link 27 but may communicate via any suitable connection. The serial link 27 enables the SDS transceiver to obtain the measurements gathered by the sensor module 26 as well as to configure the sensor module 26 according to a function being implemented. For example, an RS232 serial link may be used.

The transducer array 14, as will be explained later, comprises a set of transducers 112 (see also FIG. 6) that can each be operated independently by the SDS transceiver 12 to achieve beam forming, beam splitting, beam steering etc. according to the various functions that can be configured on the fly. A set of electrical connections 25 connects the SDS transceiver 12 to each transducer 112 individually, e.g. a pair of cables for transmitting a signal and receiving a signal for each transducer 112.

The SDS transceiver 12 is connected to the bridge computer 16 via a communication connection 29, e.g. an Ethernet link. The bridge computer 16 in this example comprises a display unit 28 for providing a user interface to enable a user to interact with the SDS transceiver 12 for selecting between different functions and viewing and analyzing data. The bridge computer 16 can be configured to operate an existing bridge software program 30. The bridge software program 30 in this example is programmed to enable maneuverability between different functions 34 by accessing and/or communicating with a software module 32 representing the instructions for implementing different subsea acoustic functions using the SDS transceiver 12 and the transducer array 14. It will be appreciated that the functions 34 and software module 32 are shown separate from the bridge software program 30 for illustrative purposes only. Some embodiments may utilize a software program that includes all functionality in single program or may comprise several distinct software modules depending on the application.

The bridge computer 16 may also include an auxiliary input 38 such as a Bluetooth, USB or other communication link to enable configuration updates 36 to be uploaded to the system 10, e.g. for reconfiguring a function or to remotely and/or automatically instruct the system 10 to switch between different functions. The updates 36 can also be used to perform firmware upgrades, sync data, download data or perform any other data transfer task required by the application. As can be seen in FIG. 2, the updates can be uploaded to the SDS transceiver 12 or downloaded by the SDS transceiver 12 from the bridge computer 16 over the Ethernet link 29 or the SDS transceiver 12 may also comprise an auxiliary input 40 that would enable the updates 36 to be provided directly. It will be appreciated that the SDS transceiver 12 in some embodiments can operate autonomously or remotely, i.e. without the bridge computer 16 or via a remote bridge computer (not shown) and thus the updates 36 and any other communications can instead be provided directly to the SDS transceiver 12. Similarly, new SDS transceivers 12 or those not currently deployed may also need programming from an external computing device and thus should be capable of communicating directly, either via the Ethernet link 29 or the auxiliary input 40. Also, the updates 36 can be used to system modules in the transducer array 14 as well as in the sensor module 26.

Figure 3:
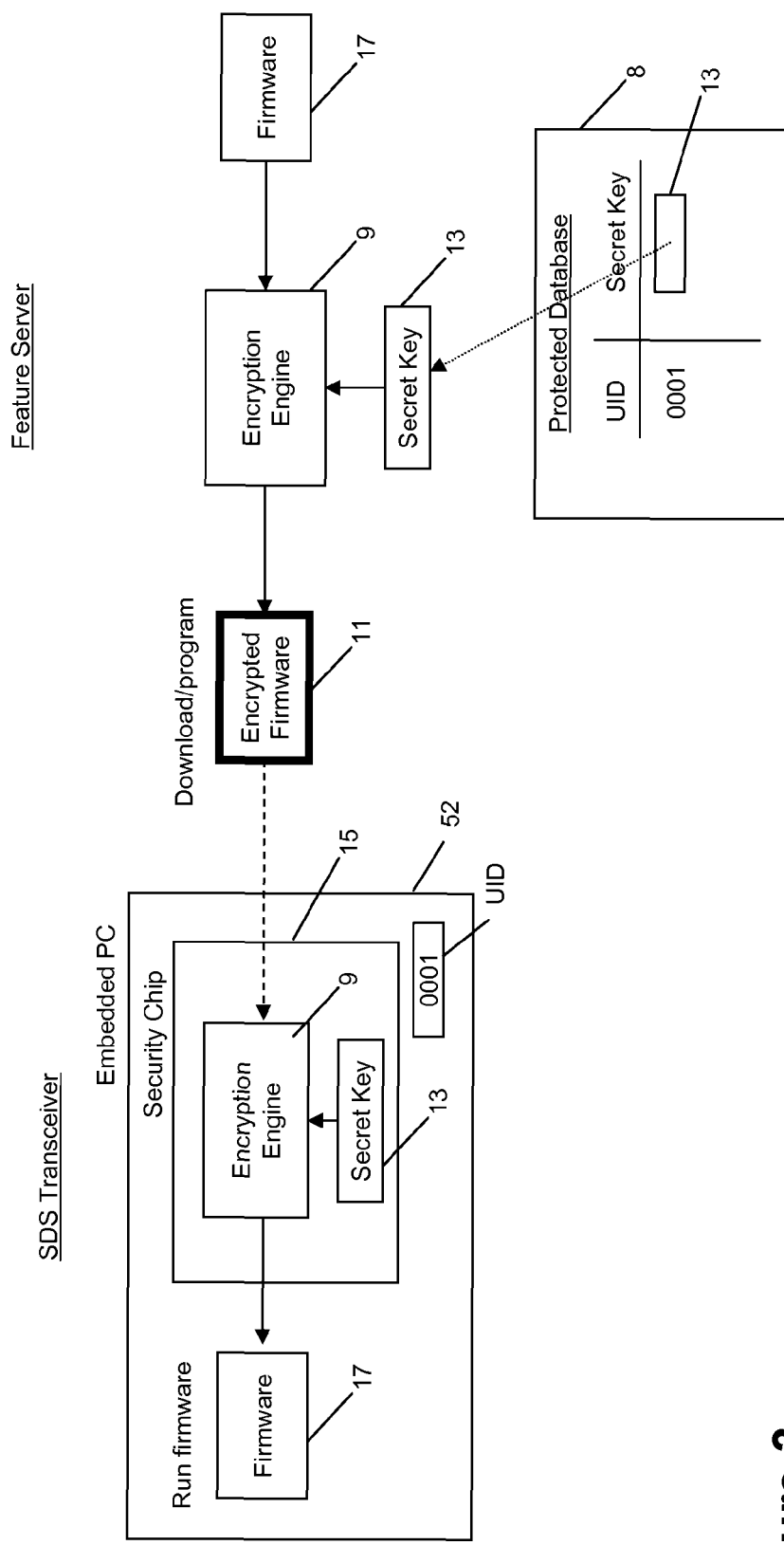
FIG. 3 is a schematic block diagram of a security layer for binding firmware used in the system to specific hardware components.

As can be appreciated, the system 10 includes various hardware components that can be configured to perform various functions 34 using firmware that either resides in the system 10 upon initial programming, or is downloaded at a later time, e.g. to upgrade the system 10 to utilize additional functions 34. Turning to FIG. 3, a security layer can be included to enable the owner of the intellectual property (IP) associated with the firmware to be protected against copying, unauthorized aftermarket upgrades, malicious code, etc. The security layer is used in this example to bind firmware to specific hardware components and/or specific products to ensure that only authorized software can be used with particular hardware and vice versa. The security layer in general associates a unique identifier (UID) with a particular system 10 (or hardware component thereof) and requires that the firmware to be used with the hardware can identify the UID, e.g. using a suitable cryptographic operation. FIG. 3 illustrates one example wherein the embedded PC 52 on the SDS transceiver 12 comprises a security chip 15 securely storing a symmetric secret key 13 and has access to a public UID (e.g. 0001 as shown). The security chip 15 also comprises an encryption engine 9 which uses the secret key 13 to decrypt encrypted firmware 11 to obtain the actual firmware 17. The security chip 15 may also compare its stored UID with one identified in the firmware 17 or with the encrypted firmware 11 as a further check and/or to ensure it is associated with the correct product. The UID may also be used to identify which hardware component in the system 10 is to be programmed.

In order to control the use of the secret keys, any firmware 17 that is generated for a particular product (e.g. for upgrading or installing a particular function or capability) is uniquely configured by compiling it for the UID according to the function it is to perform. When a customer, supplier, etc. requests a product, the UID is added to a protected database 8 at a feature server, and the database 8 generates a secret key 13 for that UID. The secret key 13 is then downloaded into the security chip 15 and the UID provided to the embedded PC 52. Either at the time of purchasing or later via an upgrade, the unique firmware 17 is encrypted by an encryption engine 9 using the secret key 13 to generate encrypted firmware 11, and downloaded by the embedded PC 52. The encrypted firmware 11, as noted above, may carry the public UID and only the proper secret key 13 stored in the security chip 15 associated with the UID can properly decrypt the encrypted firmware 11 to obtain the actual firmware 17. If the UID matches and the proper secret key 13 is used, then the firmware 17 can run. If not, then the firmware 17 is locked or otherwise denied. It can be seen therefore that the firmware 17 is bound to specific hardware so that it can only be used on the hardware that has been provisioned for that product. The customer cannot then move the firmware 17 to another product that does not have that particular feature without paying for an upgrade specific to that product.

In the example shown in FIG. 3, it can be seen that the embedded PC 52 controls the decryption of the encrypted firmware 11 for use in a particular function 34. It can be appreciated that the same principles can be applied to other modules in the system 10. For example, a security chip 15 can be installed in the sensor module 26 or the transducer array 14 (at some other location) and a secret key 13 for that particular module embedded to bind certain data to that module (see also FIG. 7). As such, the principles in FIG. 3 can be applied to other data in the system such as instructions, sensor data, log reports, etc. By binding the hardware and firmware using the UID and the secret key 13, more control can be had over the proprietary IP of the system 10 to avoid counterfeit after-market upgrades or copying of firmware 17 to other products.

Figure 4:
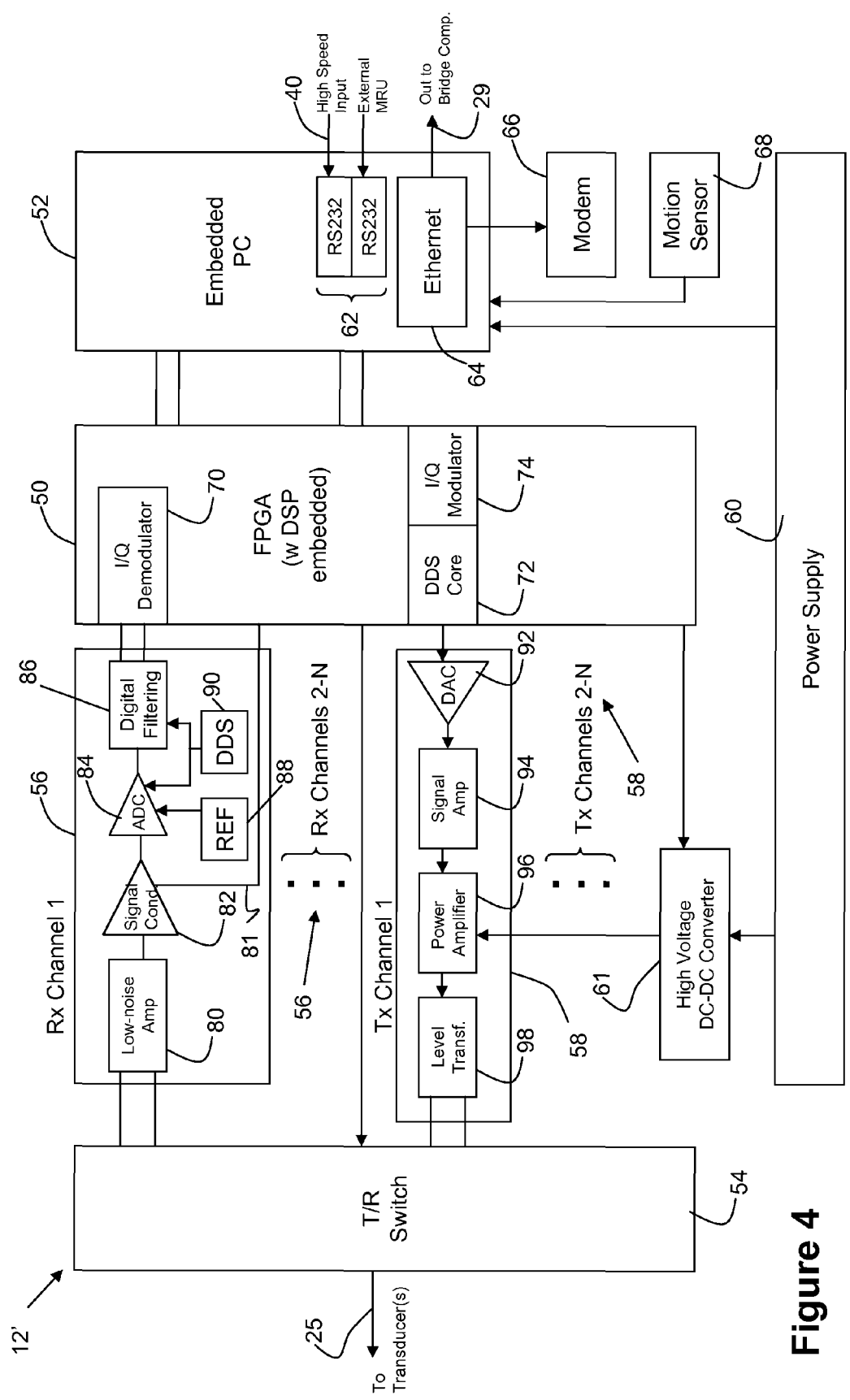
FIG. 4 is a schematic block diagram showing a general software defined subsea acoustic platform for implementing the system shown in FIGS. 1 and 2.

The SDS transceiver 12, in this example, is configured and built from a software defined subsea acoustic platform 12' shown in FIG. 4. The platform 12' provides a fully configurable computing architecture that individually can accommodate a transducer array of one or more elements to a certain size but can also be scaled to accommodate any size of transducer array by chaining multiple platform architectures together, e.g. to accommodate the transducer array 14 exemplified below. The platform 12' comprises a field programmable gate array (FPGA) 50 to enable the multiple functions 34 to be interchanged using the same unit and an embedded PC 52. The embedded PC 52 is provided to offload the intensive processing from the FPGA 50 and to enable external devices to connect to the SDS transceiver 12, in particular the bridge computer 16. The platform 12' also comprises a series of receive (Rx) channels 56 and a complementary series of transmit (Tx) channels 58 for operating the transducer(s) and for receiving data sensed by the transducer(s). In the example shown in FIG. 4, a set of N channels is provided, and it has been found that 16 channels (i.e. N=16) can be accommodated by a suitably sized FPGA 50 for implementing various desired functions 34.

The platform 12' also comprises a transmit/receive (T/R) switch 54 to control the routing of transmit signals to the transducer(s) without damaging the receiver channels 56 or other transducers that may be transmitting in another sonar application as discussed later. The T/R switch 54 also enables the FPGA 50 to select the routing for the receiver channels 56 with some versatility, namely where multiple functions 34 are being performed at the same time. The T/R switch 54 can be implemented using a semiconductor possessing high linearity, which allows for fast switching between different transducers as well as between transmit and receive channels 56, 58. To allow for minimal cross talk between channels 56, 58, the T/R switch 54 can be constructed using a Triac switch or relay to route the active transmit channels 58 to the transducer(s), while having the transducers not currently transmitting grounded using a Mosfet switch. In a receive mode, the Triac switch can also be used which allows the transducer signals to be routed to the proper receive channel 56.

The receive channels 56 each comprise various stages in this example for processing the incoming transducer signals routed thereto by the T/R switch 54. A low-noise amplifier 80 is used, as its name would suggest, to amplify the incoming signal without adding significant noise and while exhibiting high linearity capabilities and providing some impedance matching with the transducer. It has been found that high linearity can be important in detecting low level signals in the presence of high noise levels and interference. For example, if the processing here is not linear, the high level signal may clip the low level signal. Also, impedance matching is typically important in enabling maximum power transmission between the transceiver 12 and the transducer elements 112. In the configuration shown herein, typical impedance matching is 600Ω. It may be noted that by changing components on the front end of the receive channel 56, the impedance matching can be adjusted to suit the particular application, e.g. 20Ω, 50Ω, 1 kΩ, etc.

After passing through the low-noise amplifier 80 the signal is then conditioned by an signal conditioner 82 (e.g. for attenuation or amplification) that can be controlled by the underlying software using a control signal 81. It has been found that a 0-40 dB programmable range providing a 40 dB maximum attenuation of the signal is suitable. The signal conditioner 82 can be used to add negative gain to the signal, which is advantageous when dealing with high level input signals. The signal generated by the transducers 110 are analog signals. In order to digitally process the data in the signal, the signal is fed through an analog-to-digital converter (ADC) 84. For the configuration shown, a 24 bit ADC 84 is appropriate that is based on a sigma delta conversion technique and which uses an over-sampling method to spread the quantization noise across a wide bandwidth. The ADC 84 may include a modulator (not shown) to shape the noise and shift it to a higher frequency. The signal, once converted to a digital form, undergoes digital filtering 86. The digital filtering 86 can be used to remove the out-of-band signal, which reduces noise and distortion in the signal and maintains linearity and the phase of the signal. The digital filtering 86 can also perform signal anti-aliasing. Digital filtering 86 that provides 120 dB attenuation at the Nyquist frequency has been found to be suitable and which acts as an finite impulse response (FIR) filter with 96 taps with software configurable coefficients. A reference (REF) 88 is applied to the ADC 84, which provides a filtered, low-noise reference voltage that gives the absolute voltage value to the samples such that any samples that are read can be readily converted into acoustic dB, given a particular transducer type. A direct digital synthesizer (DDS) 90 may also be provided to generate the frequency that drives the ADC 84 and digital filtering 86. The DDS 90 is a fully programmable module which can allow the system 10 to perform various types of sampling according to the desired filtering. For example, a standard frequency of 20M samples/second can be achieved.

The receive channels 56 provide filtered digital signals to an in-quadrature (I/Q) demodulator 70 on the FPGA 50, which demodulates the incoming signal so that it may be further processed by the FPGA 50. The I/Q demodulator 70 in this example is used for transforming temporal signals into two different signal schemes, one in-phase and the other in-quadrature, which is useful in achieving signal standardization. The FPGA 50 is used to perform the bulk of the signal processing and due to its inherent programmable capabilities, enables the transmit channels 58 and receive channels 56 to operate according to different functions for implementing different subsea acoustic applications as discussed above. A particularly suitable FPGA 50 is a 65 nm chip sold under XILINX™. The FPGA 50 advantageously comprises encryption/decryption capabilities such as AES to enable the protection of IP associated with a particular software-defined application operating via the SDS transceiver 12, e.g. by using the UID and secret key 13 discussed above. The FPGA 50 may also comprise an embedded high performance digital signal processor (DSP) for filtering, performing Fast Fourier Transforms (FFTs), correlations, modulations etc. As noted above, the FPGA 50 performs signal processing, which enables the delivery of filtered and prepared data to the embedded PC 52 for mathematical processing. In this way, the FPGA 50 can emulate an 8 bit or 32 bit microprocessor, which is programmed on the fly to run any type of firmware per the chosen function 34.

The FPGA 50 also comprises an I/Q modulator 74 for generating a modulated digital signal for generating transmit signals for driving the transducers 112. The modulated digital signal generated by the FPGA 50 is then processed by a DDS core 72 to synthesize the signal output by the I/Q modulator 74. The signal, as processed by the DDS core 72, is then input to a digital-to-analog converter (DAC) 92, which transforms the digitally modulated signal into an analog signal that is suitable for driving the transducer 112. It has been found that a DAC 92 providing a 86 dB spurious free dynamic range for a signal of up to 1 MHz is suitable. The analog signal is then provided to a signal amplifier (amp) 94, which buffers the signal for the power amplifier 96 since, in this example, the DAC 92 does not utilize any buffering and, to provide impedance matching and to facilitate power transmission. In some embodiments, the power amplifier 96 can be a Class-H type amplifier, i.e. a linear Class-B type as is known in the art, although other types of power amplifiers 96 can be used. It has been recognized that although a Class-D type amplifier could be an appropriate choice for a sonar application, Class-D amplifiers typically have a high frequency of 600 kHz, which makes such an amplifier unable to provide a signal with good phase information, which does not lend itself to a broadband operation due to its inherent transistor architecture. Using a Class-H type amplifier with a dynamic control for the voltage power supply, the overall efficiency of the transmission can be increased to even 80%, compared to approximately no more that 50% in a standard Class B type. Also, since Class-H amplifiers do not generate as much heat, a smaller heat sink can be used and the form factor is also typically small. It has been found that an amplifier 96 with a maximum power output of 4 kW at 20?, maximum duty cycle of 3% and a 30 ms maximum pulse length is suitable for the configuration shown.

As can be seen in FIG. 4, a high voltage DC-DC converter 61 allows the voltage of the power amplifier 96 to be stepped according to the voltage amplitude of the transmit signal required. In this example, the voltage can be programmed, e.g. between 45V and 105V via a command from the FPGA 50. The power being regulated is provided by a power supply 60, which also powers the embedded PC and any other component in the SDS transceiver 12 or platform 12' that requires power. Different voltages can be generated based on the core technology used, i.e. the application of the platform 12'. Also, voltages can be isolated and parallelized to provide extra filtering.

The signal output by the power amplifier 96 is then provided to a level transformer (transf.) 98 to match the transmit signal to be provided to the transducer 112 to a standard impedance, e.g. 50?. In this way, an impedance value can be standardized such that any type of sensor can be driven and thus the SDS transceiver 12 or platform 12' can interface with a wider variety of transducers from various third party suppliers. The signal output from the transmit channel 58 is then redirected by the T/R switch 54 to the appropriate transducer 112 via an appropriate connection 25, according to the firing sequence, e.g. per a beam-steering sequence or other configuration according to the function 34 being used at that time.

The SDS platform 12' may also incorporate a motion sensor 68 as shown in FIG. 4, which may itself comprise one or more accelerometers, one or more gyroscopes and one or more magnetometers to provide 3D angles, rate of change of angles and accelerations of the unit using the SDS platform 12'. Such information can be used by the software running on the embedded PC 52 to determine a more accurate angle of arrival of a receive signal, e.g. to compensate for movement of the transducers 110. The embedded PC 52 in this example comprises various data links for communicating with external elements. In this example, two serial data links 62 (e.g. RS232 connections) are provided to facilitate a high speed input, external motion reference unit (MRU) etc. An Ethernet connection 64 is also provided, which, as discussed above, enables the SDS platform 12' to communicate with a bridge computer 16 and, as exemplified in FIG. 4, also enables a power line coupling modem 66 to be linked to the embedded PC 52. The modem 66 can be used to send data over the power supply cable (not shown), e.g. when the platform 12' is being used underwater and powered with a tethered cable. It is expected that a data rate of 2.5 Mbits/s can be achieved over 1500 m.

The embedded PC 52 can be a fan-less, off the shelf component, and is used to provide enough processing power to process data in real time. The processing power can be achieved using a real-time embedded Linux architecture. Alternatively, if configured to process data without a preemptive task, the embedded PC 52 may be installed with other operating systems such as Windows®. The embedded PC 52 also provides the SDS platform 12' with the capability of communicating with external devices and peripherals such as network connections, sensors, etc. The embedded PC 52 may communicate with the FPGA 50 on a suitable parallel protocol. A USB port (not shown) can also be included for plug-and-play devices such as cameras, storage devices etc.

Figure 5:
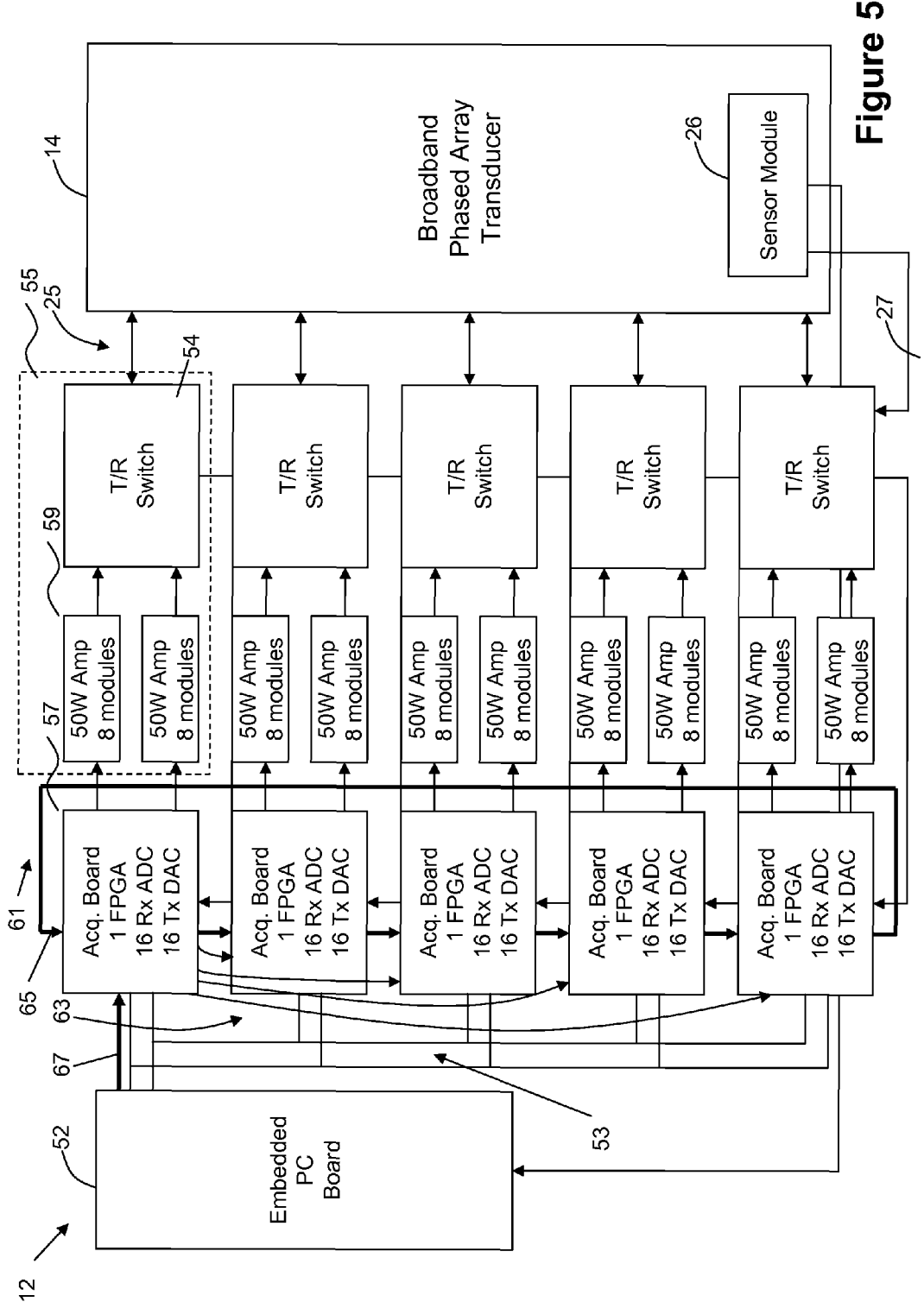
FIG. 5 is a schematic block diagram of the system shown in FIGS. 1 and 2 implemented using the platform shown in FIG. 4.

The SDS platform 12' described above not only allows the architecture shown to be fully configurable on the fly to perform various functions 34, it can also be scaled to work with large arrays, such as the broadband phased array transducer 14 shown in FIGS. 1 and 2. An example of the use of the SDS platform 12' to implement the SDS transceiver 12 described earlier is shown in FIG. 5. In this example, each platform 12' used to scale the transceiver 12 provides 16 channels. The embedded PC 52 is similar to that shown in FIG. 4 and is coupled to a PCI bus 53 to connect the embedded PC 52 to the first acquisition board 57 and in this example is redundantly connected to one or more additional or all other acquisition boards 57, e.g. a PCI-EXPRESS bus capable of handling 2.5 Gbit/s data flow. Each acquisition board 57 has associated with it, an amplifier/switch board 55 to provide a "unit" 61 implementation of the platform 12' shown in FIG. 4 and each amplifier/switch board 55 comprises a set of receive channels 56, a set of transmit channels 58 and a T/R switch 54. In this example, each acquisition board 57 provides the FPGA 50 and transmit and receive circuitry for 16 channels of each. The board 55 comprises a pair of amplifier boards 59, each comprising the power amplifiers 96, the signal amplifiers 94, the level transformers 98 and the DC-DC converters 61 for the transmit channels 58; and a T/R switch 54 configured for 16 channels. In this way, an 16*X-channel system 10 can be created by linking X units 61 together as shown in FIG. 5. In the example shown, 5 units 61 are used to create a parallel 80 channel Tx/Rx system 10. Each FPGA 50 on a respective acquisition board 57 is linked to an adjacent FPGA 50 using a pair of high speed serial buses creating a loop 65 amongst the FPGAs 50. In this example, a 2 Gbit/s data flow capability can be achieved and can enable samples to be shared between the beam-forming software written to the FPGAs 50. An additional fast serial bus 67 can also be provided from the embedded PC 52 to the first acquisition board 57 in order to communicate with this acquisition board 57 as a master. Additional links 63 from the master to each slave may then be provided to create the master-slave relationship amongst the linked-together units 61. The links 63 are in this example parallel to the main bus 53 to allow direct links between the boards 57.

In order to be able to beam-steer and beam-form in a coherent way, the SDS transceiver 12 is in this example configured to have one single clock source (not shown) shared on the multiple acquisition boards 57. This allows the SDS transceiver 12 to synchronize very accurately the transmit and receive operations for every channel. One clock is used as a master, and is amplified and driven to all the stacked acquisition boards 57, e.g. over the additional links 63. In this example, the first FPGA 50 in the stack acts as a master, and ensures the other FPGAs 50 work on the same clock edge. This allows coherent transmit and receive from ping to ping, which can be extremely advantageous for synthetic aperture sonar.

Each amplifier 96 drives one element of the broadband phased array transducer 14 and the signal can be sent from the FPGA 50 to each amplifier 96 as a pilot signal +/−1 Vpp which is then amplified and sent to the T/R switch 54 as described above with respect to the platform 12'. The T/R switches 54 transmit power waves (transmit signals) to the transducer array 14 over the connections 25 and a clamping signal is fed back from the T/R switch 54 to the acquisition board 57 when in receive mode. It may be noted that when in receive mode, the connections between the amplifiers 96 and the T/R switches 54 are seen as high impedance in this configuration. It can therefore be seen that various acquisition boards 57 and amplifier/switch boards 59 can be linked together to build a software defined solution using several "units" 61 created according to the platform 12' shown in FIG. 4. For example, linking six units 61 together would enable a transducer array 14 having 96 elements to be driven. It will be appreciated that each unit 61 can provide any number of channels depending on the choice of hardware for the platform 12' and the 16-channel version shown in FIG. 5 is for illustrative purposes only.

Figure 8:
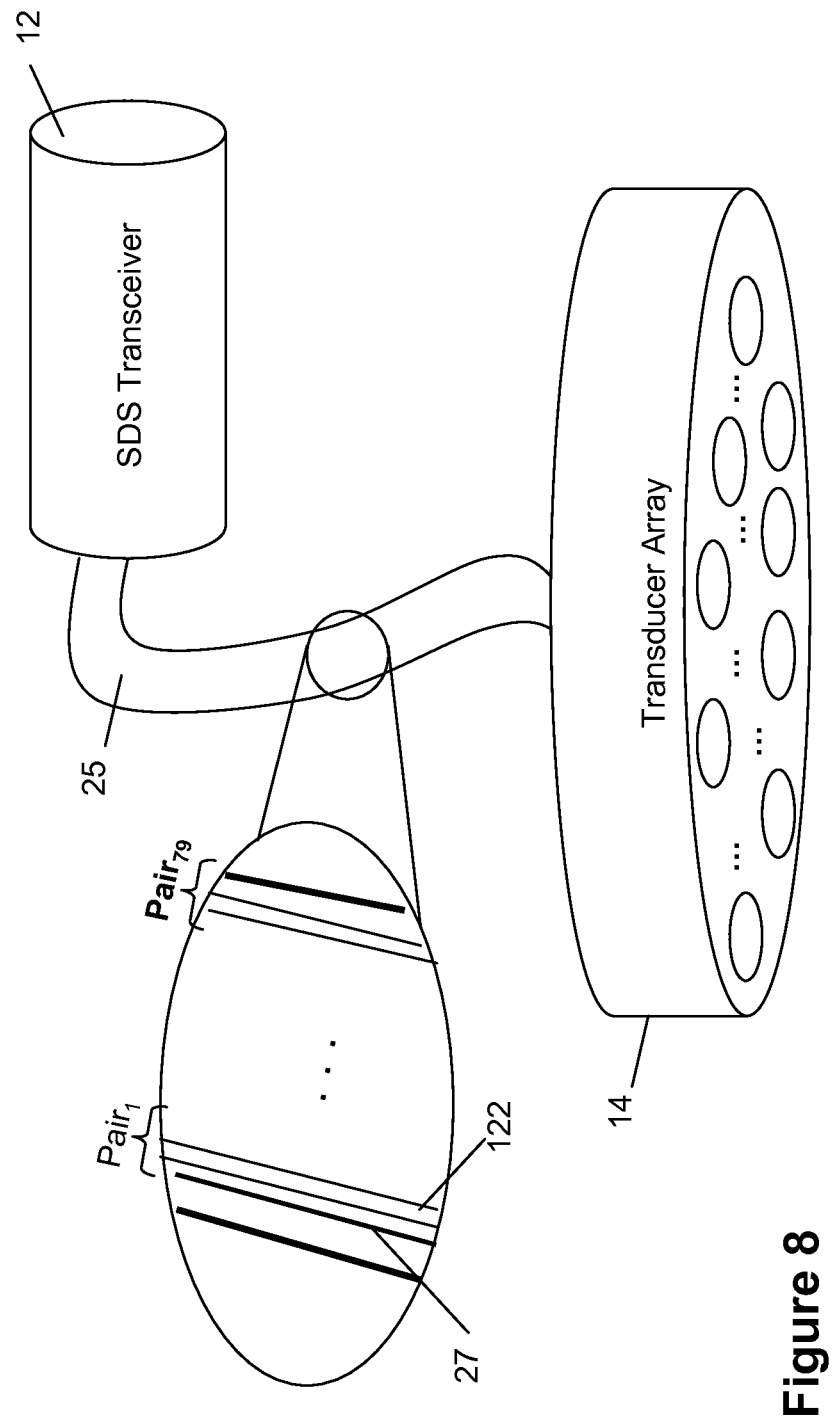
FIG. 8 is a perspective view showing a cabling arrangement between a software defined sonar (SDS) transceiver and a broadband transducer array.

In addition to synchronization of the clocks in the stacked implementation shown in FIG. 5, the entire system 10 can be synchronized to accommodate changes in the environment and fatigue of transducers. As illustrated in FIG. 8 (discussed later), the SDS transceiver 12 is connected to every transducer 112 in the array 14. A procedure can be programmed in the SDS transceiver 12, connected to the bridge software program 30, which allows an operator to test the positioning of the elements into the array 14, and the level of performances. By pinging on one element, and receiving on others, the system 10 can measure time of arrival from the transmitted signal, and amplitude. This can be done on multiple combinations of transmit, to locate every single transducer 112, and decide if level is okay, and therefore detect any failure of any element.

The above procedure can be used to perform various functions. For example, on-board diagnostics of the full chain, and more precisely the transducer 112. Also, an auto detection of an element, and auto routing of the SDS transceiver hardware to the transducer 112 can be plugged without taking care of transducer order. If a failure is detected on one transducer 112, then the system 10 can take in account that one or more elements of the array 14 have failed, and dynamically remove it from the beam-forming routine. Although this can lead to a downgraded operational mode, where performances are a bit different from expected, some functionality can still be provided while the system 10 is deployed rather than simply ceasing operations.

The sensor module 26 can be connected to the SDS transceiver 12 to provide a unique ID for the transducer array 14 (e.g. to couple the two units) as well as calibration data pertaining to the transducer array 14. In this example, the sensor module 26 provides the ID and calibration data to the T/R switch 54, which may then route such data through the acquisition board 57 to the embedded PC 52 for further processing. As discussed above, the sensor module 26 can measure movement of the transducer array 14 through a motion sensor, which can be provided directly to the embedded PC via a high speed serial link. The connections between the sensor module 26 and the SDS transceiver 12 are collectively referred to as the serial connection 27 discussed above.

Figure 6:
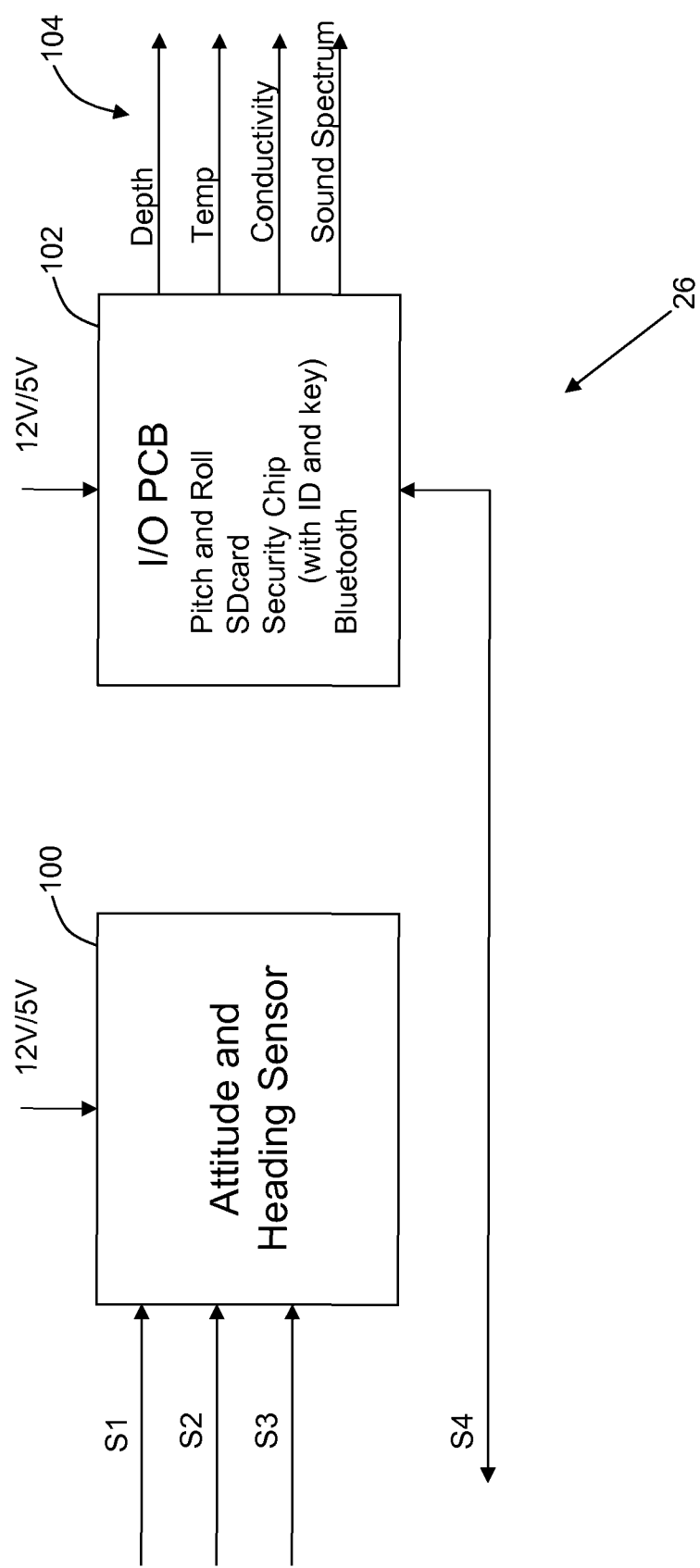
FIG. 6 is a schematic block diagram of the sensor module shown in FIGS. 2 and 5.

Further detail pertaining to the sensor module 26 is shown in FIG. 6. The sensor module 26 comprises an attitude and heading sensor board 100, e.g. an Xsens MTi™ sensor and an input/output (I/O) printed circuit board (PCB) 102 that operate in parallel where the board 100 works as a motion sensor unit and board 102 is a multi-sensor unit (e.g. temperature, depth, conductivity etc.). As noted above, the sensor module 26 is situated directly in/on the transducer array 14 in order to obtain measurements directly and thus inhibiting biases introduced through relating movement of the transducer array 14 to the vessel 20. The sensor 100 comprises three connections, labelled S1, S2 and S3 in FIG. 6. S1 is an analog synchronization input that can be used to optionally interface to other transducers. S2 is a digital synchronization signal input that can be used to interface to the other transducers (if any). S3 is an RS422 connection for configuring the motion sensor on the board 100 and for transferring motion sensor data directly to the embedded PC 52. A fourth connection S4 is linked to the I/O board 102 and in this example is an RS232 serial link. The I/O board 102 also outputs a series of measurements, such as a depth measurement, temperature measurement, conductivity measurement and sound spectrum. The sound spectrum measurement can be taken using a microphone made from, e.g., a pvdf material, and enables the system 10 to measure wide band noise around the transducer element 112, which allows the system 10 to determine what noise is created around the transducer element 112. Such noise analysis enables the system 10 to remove some noise from the signal received by de-correlating information from the transducer and from the microphone interface.

The board 102 can provide static pitch and roll measurements related to the orientation of the transducer array 14. The board 102 can also provide a dynamic pitch and roll and yaw of the transducer array 14, the unique ID and a secret key embedded on a secure chip included on the I/O PCB 102 (e.g. through a direct solder), memory for transducer array performance data (e.g. acoustic, electrical, beam plot vs. frequency etc.), depth measurement (e.g. using an MPT depth sensor) typically an external sensing element, temperature measurement (e.g. using an MPT RTD precision sensor) also typically an external sensing element, a salinity measurement (e.g. using a 3rd party EM or conductivity sensor), and a conductivity-temperature-depth (CTD) sensor to allow fine beam-forming by enabling the measurement of the sound velocity profile of seawater to enhance beam steering. It may be noted that near-field acoustic imaging requires that the geometry and the sound velocity between the observation system (e.g. sonar) and the scene (e.g. seafloor) be known. An incorrect sound velocity can lead to degraded imagery and poor image quality. The board 102 may also comprise a mechanical noise sensor using a broadband (e.g. 1 Hz to 300 kHz) hydrophone such as a PVDF sheet internal to the transducer array 14 to allow active noise cancellation, a Bluetooth link to allow downloading of wireless data for the transducer array 14 while acoustically calibrating prior to being deployed, an internal transducer temperature monitoring sensor, an acoustic calibration capability to allow updates 36 to be applied during the life cycle of the sensor module 26 and many other features.

The sensor module 26 can also be firmware upgradeable, provide a magnetic heading using the sensor board 100 and can include gauges to measure stress on the transducer array 14, which can be correlated to acceleration and fatigue as discussed above.

Figure 7:
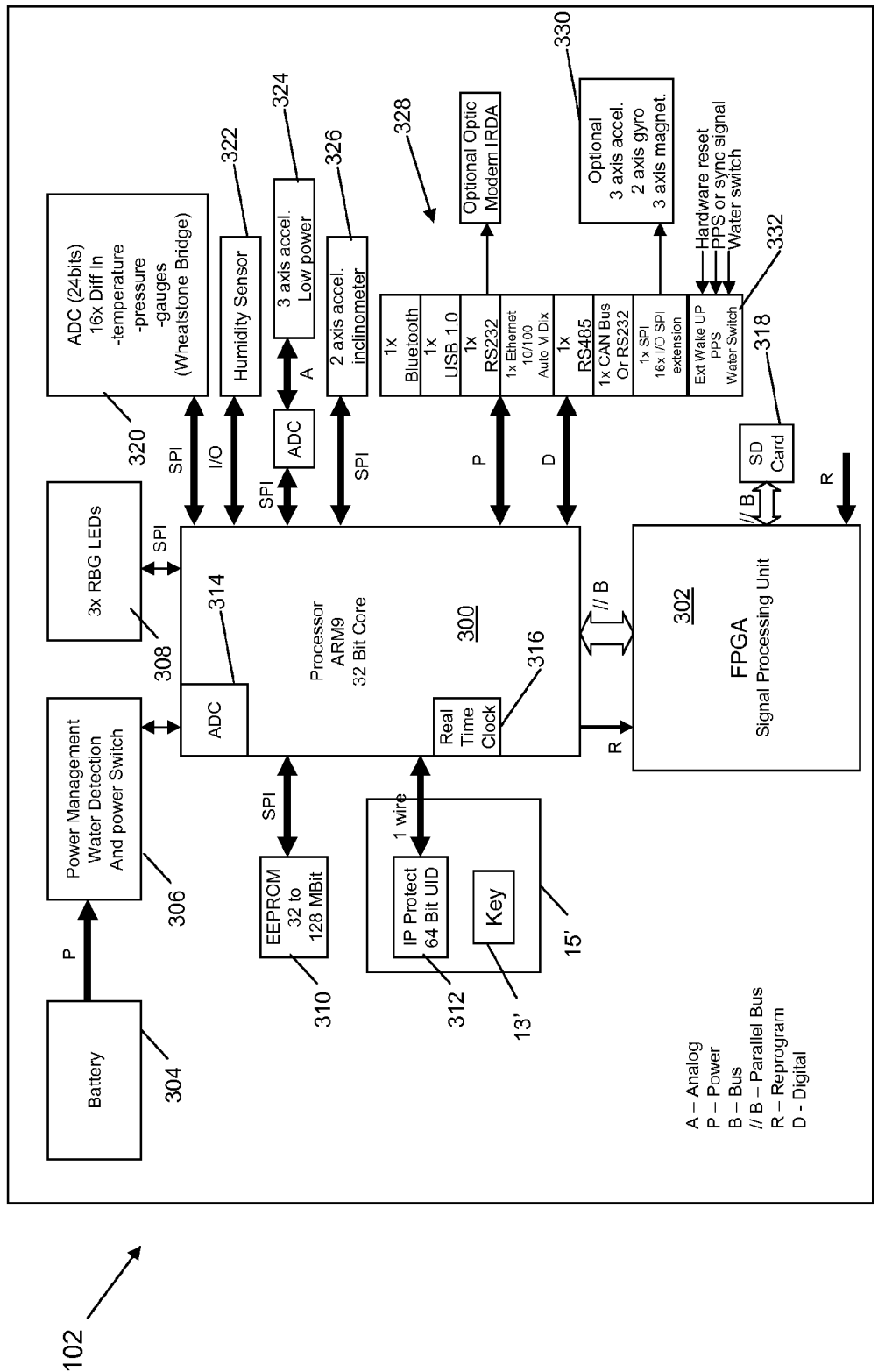
FIG. 7 is a schematic block diagram of an exemplary configuration for implementing the I/O board shown in FIG. 6.

One configuration for the I/O board 102 is shown in FIG. 7. In this configuration, a processor 300 and FPGA 302 are used to perform the data acquisition and any on-board processing as well as establishing communications with the SDS transceiver 12. The board 102 comprises a battery 304 (unless outside power is available) and may utilize a power management, water detection, and power switch 306 to control power to the processor 300 and thus the other components. The board 102 may also utilize a set of LEDs 308 for visual indicators for testing and operational stages. An EEPROM 310 can be used and the unique ID 312 and a secret key 13' can be stored and accessed by the processor 300 using a connection with a security chip 15'. The FPGA 302 may access an SD card 318 for storing data (e.g. log data). The board 102 also comprises an ADC 320 with various inputs for sensors such as temperature, pressure, conductivity, and as well as gauges. A humidity sensor 322 is also provided to detect leakage in the sensor module 26. A 3 axis accelerometer 324 is connected to the processor 300 through an ADC 325 and a 2 axis inclinometer 326 is also connected to the processor 300 for measuring the pitch and roll of the sensor module 26 (and in turn the array 14 in this example). Various configuration and data connections can be made by providing various communication modules 328, examples being shown in FIG. 7. A 3 axis accelerometer, 2 axis gyro and a 3 axis magnetometer in a motion unit 330 can optionally be provided. An external wake up water switch 332 is also shown which is used to turn on the board 102 when it contacts water (i.e. when deployed).

FIG. 8 illustrates a perspective view showing the connections between the SDS transceiver 12 and the transducer array 14. In this exemplary illustration, it can be seen that a bundled cable 25 sheaths and thus contains a wire pair 122 for each transducer element 112. Two wires are required per element, for differential drive transducer element one is used in transmit and one is used in receive. Each pair of wires is protected with a surrounding shield for electrical noise immunity. In the example shown, having 79 transducers 112, there are 79 wire pairs 122. The bundled cable 25 protects the wire pairs 122 and carries them to the SDS transceiver 12 wherein the appropriate connections are made to the acquisition boards 57.

Figure 9:
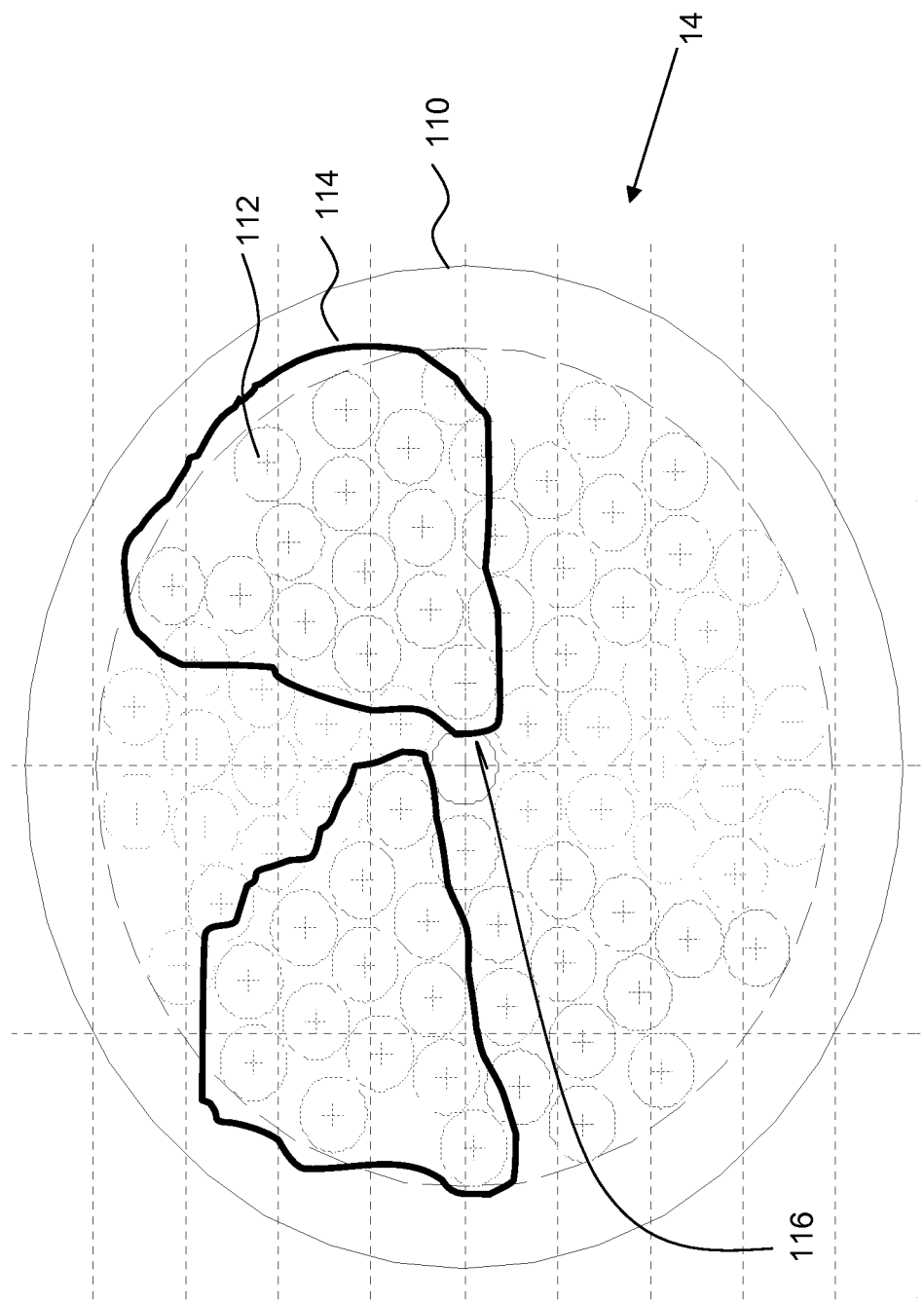
FIG. 9 is schematic plan view of the broadband phased array transducer.

An exemplary arrangement of a set of transducer elements 112 into the broadband phased array transducer 14 is shown in FIG. 9. In this example, there are 79 non-uniformly spaced, tightly packed transducers 112, grouped into 6 identical sectors 114 of 13 elements in each sector 114 and 1 center element 116 (i.e. 6*13=78+1=79). In this way, the SDS transceiver's 80 channels can connect to each and every transducer element 112 as needed. In this example, the transducer elements 112 are relatively large in diameter (e.g. 1.4" or 35 mm) and have a relatively large center-to-center spacing (e.g. >?/2) to balance the competing objectives of cost and performance/size. In this configuration, the transducer element size and spacing requires wideband use and consideration of side-lobe nulling to reduce side-lobe signals that may indicate false targets. The transducer elements 12 shown in FIG. 9 have been tested with a bandwidth of 24 to 52 kHz resulting in good comparative performances. It may be noted that the SDS transceiver 12 is capable of a complete broadband, e.g. 1 kHz to 1 MHz and can be dynamically tuned within this broadband range using the same amplifier configuration described above. It will be appreciated that several transducer arrays 14 may be required to cover the entire range. The transducer elements 112, arranged as shown in FIG. 9, can be mounted to a structure 110 and the structure 110 may then be mounted to the underside of the marine vessel 20 (e.g. the hull of a ship).

As noted, to extend the frequency coverage, multiple transducer arrays 14 can be used, and connected to another SDS transceiver 12 if necessary. Therefore, the SDS transceivers 12 can be synchronized together to sound at different frequencies, and then those frequencies can be used together to improve classification of targets, with multiple frequency information. The transducer array 14 can also be implemented with different quantities of transducers, e.g. an array covering 120 kHz to 180 kHz with 48 elements. As such, the same SDS transceiver 12 can be used with different transducer tables to connect to other arrays.

Figure 10:
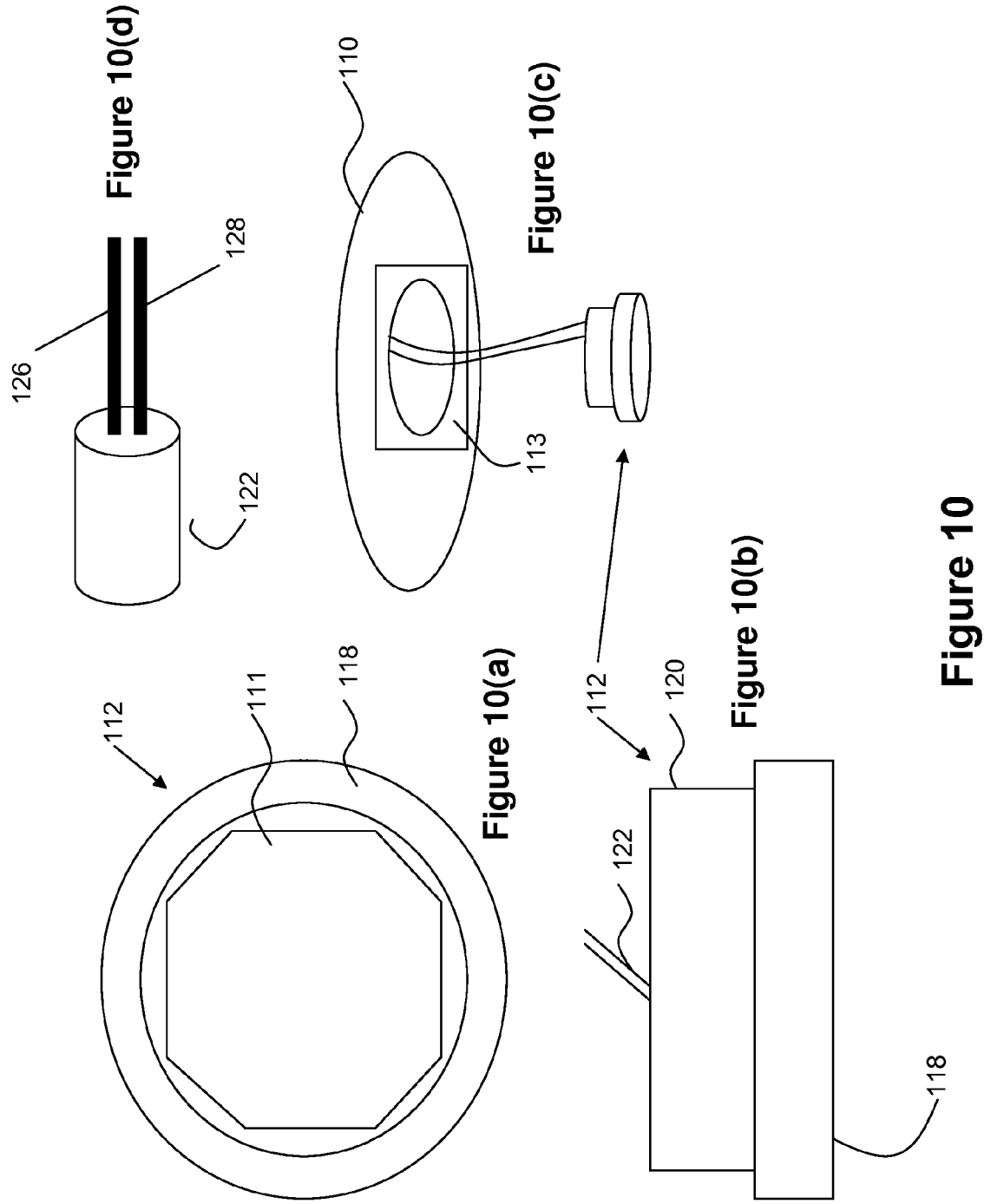
FIGS. 10(a) through 10(d) show various views of an individual transducer for the array shown in FIG. 9.

FIG. 10 shows further detail of an exemplary transducer element 112. The transducer element 112 typically comprises a piezoelectric plate 111 for generating and detecting pressure signals, which is supported within a mounting flange 118. The mounting flange 118 enables the transducer element 112 to be mounted to the structure 110. The electronics (not shown) that drive the piezoelectric plate 111 are contained within a housing 120 connected to the flange 118. A wire pair 122 extends from the body and, as shown in view (d) and is carried by the bundled cable 25 mentioned above. A transmit wire 126 and a receive wire 128 can be seen. As shown in view (c) the flange 118 may be received by an opening 113 in the structure 110 to permit attachment of the transducer element 112.

Figure 12:
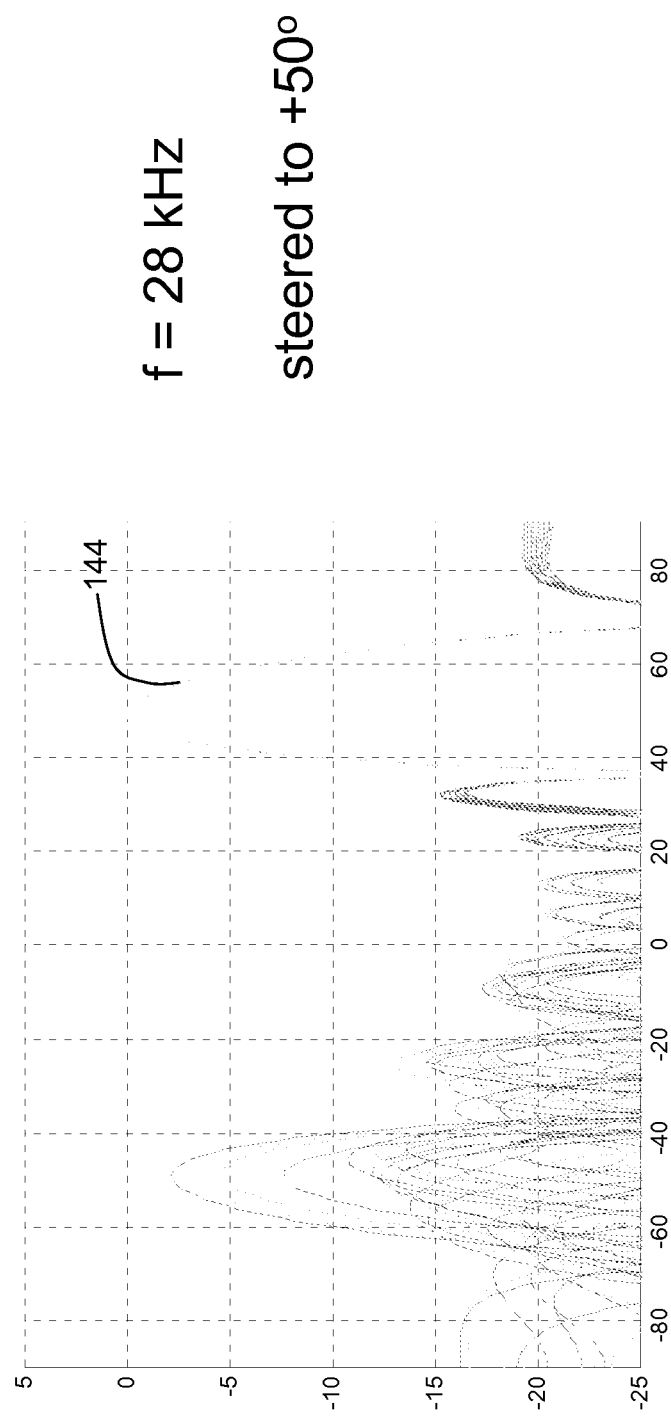
FIG. 12 is a plot of a beam pattern for the array at 28 kHz, steered to +50 degrees.
Figure 13:
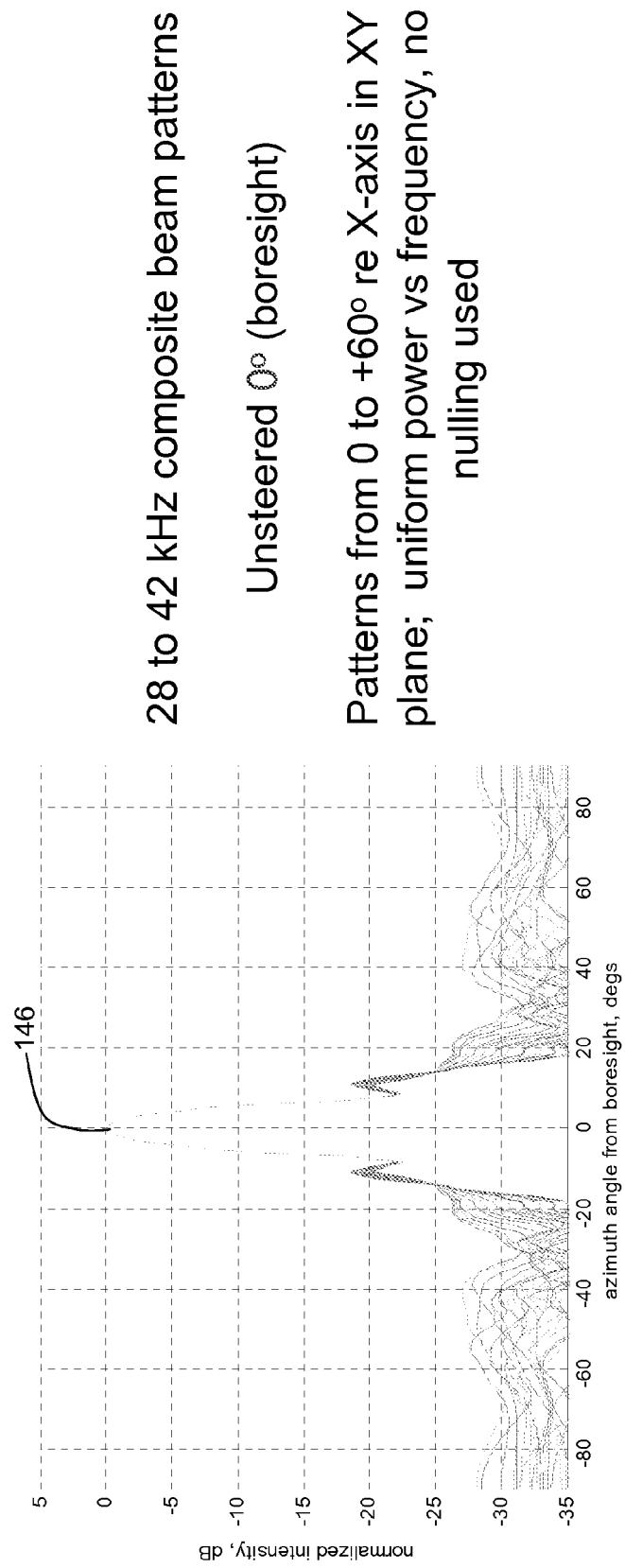
FIG. 13 is a plot of a broadband composite beam pattern for the array in the range of 28 to 42 kHz, un-steered from boresight.
Figure 14:
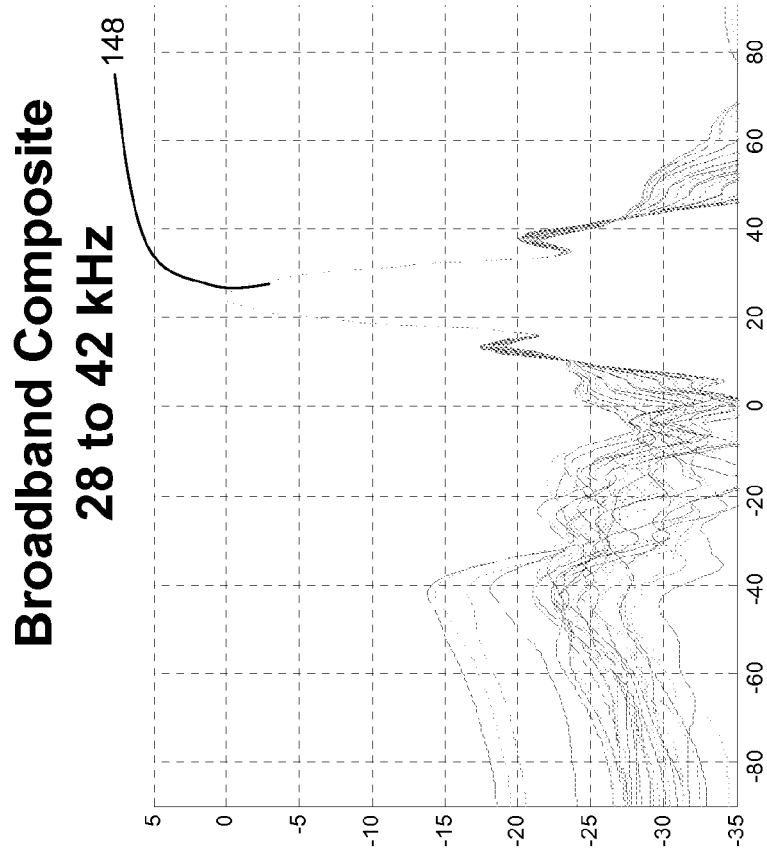
FIG. 14 is a plot of a broadband composite beam pattern for the array in the range of 28 to 42 kHz, steered 25 degrees from boresight.

FIGS. 11(a) and 11(b) illustrate simulated beam plots to illustrate the ideal, expected performance of the transducer array 14 shown in FIG. 9. FIG. 12 illustrates a beam at a frequency of 28 kHz and steered to 50 degrees to illustrate the performance of the transducer array 14. FIGS. 13 and 14 illustrate composite beam patterns for a transducer array 14 having a 28 to 42 kHz bandwidth, un-steered and steered 25 degrees respectively to further illustrate exemplary results of operation for the transducer array 14.

Figure 15B:
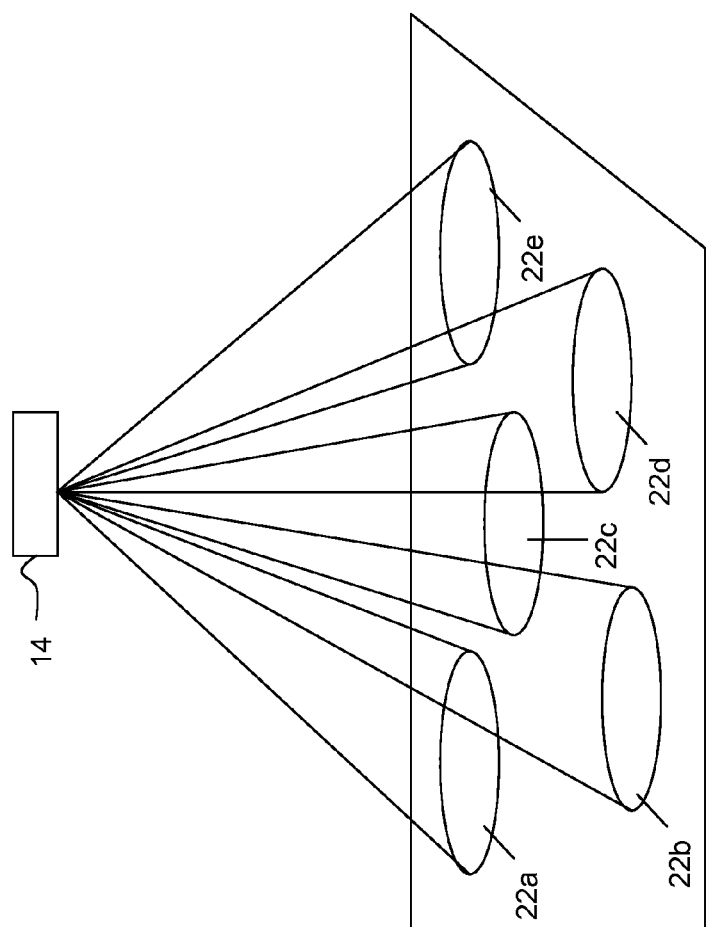
FIG. 15(b) is a pictorial view showing separately steered and processed beams generated by the array.
Figure 15A:
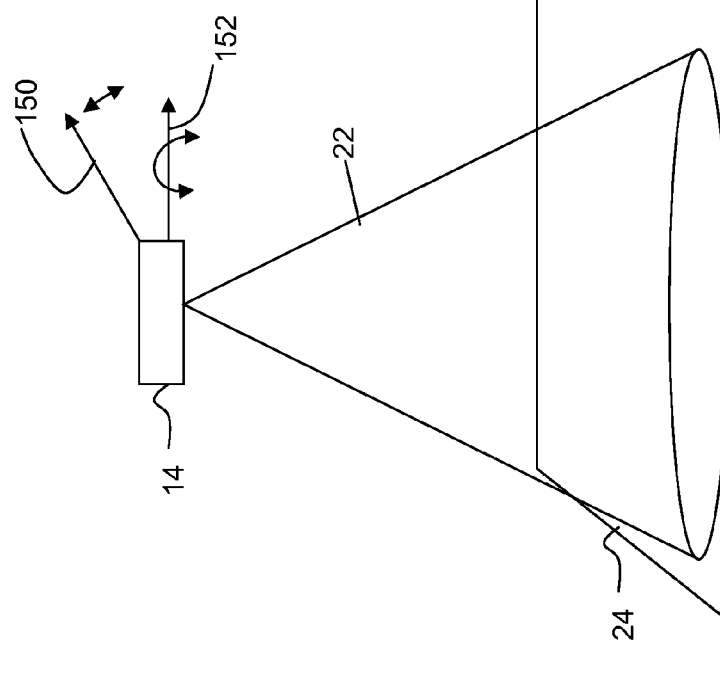
FIG. 15(a) is a pictorial view showing a single beam generated by transmitting all elements of the array in phase.
Figure 16:
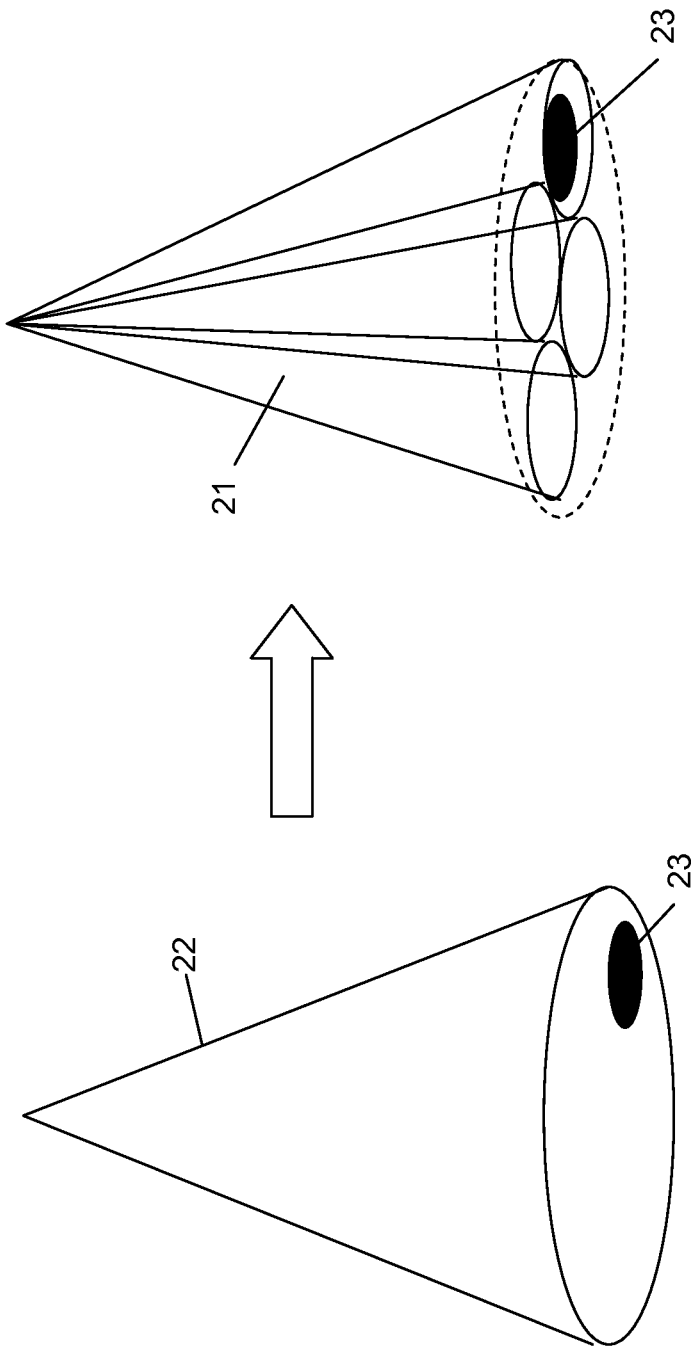
FIG. 16 is a pictorial view illustrating beam splitting of a single beam using four quadrants for target detection within the single beam.

By utilizing a large number of transducer elements 112 as shown in FIG. 9, the transducer array 14 is capable of generating a single focused beam 22 as shown in FIG. 15(a) as well as several individual split-beams 22a-22e as illustrated in FIG. 15(b). FIG. 15(a) also illustrates that the inclusion of the sensor module 26 described above enables a direct pitch measurement and roll measurement to be taken with respect to the respective axes 150, 152. The number of beams required is dependent on a selected function 34 and, the SDS transceiver 12, being fully programmable, can interchange between various functions as discussed above. FIG. 16 illustrates that a single beam 22 can be segmented into quadrants 21 to implement a split beam analysis for better detection of a target 23. Such beam splitting is discussed in greater detail below.

To operate the SDS transceiver 12, the embedded PC 52 may be synchronized to display to the bridge computer 16 over the Ethernet link 29 and may be configured such that the embedded PC acts as a client while the bridge computer 16 acts as a server such that the bridge computer 16 is used as an interface and data display unit for an operator. The bridge computer 26 can then be synchronized with an external service over a network such as the Internet to have a synchronized date/time stamp that is standardized for all data inputs. Through such an external link, GPS data can be directly fed to the embedded PC 52 to enable the synchronization of clocks etc. Based on the selected function 34, the bridge computer 26 sends a request to the SDS transceiver 12 with instructions to transmit according to a defined period of time and to listen for received signals for a defined period of time. Similarly, the bridge computer 16 (or other device) can send commands remotely to the SDS transceiver 12 to request transmission at a precise time. The SDS transceiver 12 then transmits the appropriate signal, receives the signal, performs filtering and sends the filtered digital data back to the bridge computer 16 for display and further mathematical processing.

The SDS transceiver 12 can therefore be configured on the fly to perform the various functions 34. In order to perform such functions 34 various techniques are utilized. For example, to implement multi-beam echosounder insonification of the water column and beam steering, for a long range application, the embedded PC 52 can retain a copy of the signal to be transmitted. This signal can be a complex frequency modulated signal within a bandwidth of, e.g. 10 kHz with a 1 ms length. In this example, the signal to transmit would be a 50000 sample table (1 ms, 50 Msamples/s, 16 bits), which is stored in each FPGA 50. A 1 ms acoustic signal is then transmitted for each of the beams, e.g. 80 beams using the 79 transducer elements 112 every 2 ms, with the specified beam orientation (e.g. according to beam stabilization computations—see below) It may be noted that the number of beams that can be formed is independent of the number of transducer elements 112. For example, with 79 elements, a single beam can be created or a greater number beams than number of elements such as 200 beams. This would take 162 ms in insonify the full water coverage for all 80 beams. For short range applications, the signal to be transmitted in this example would still be 1 ms but the 80 beams are transmitted as 10 sub-beams covering the same area. The transmit would again be performed every 2 ms, which would take approximately 20 ms to insonify the full water volume required for 80 beams in receive mode. In this way, the transducer array 14 can more quickly scan a given area due to the many transducer elements 112 being used.

Once all of the water that is desired to be studied is insonified, all receive signals are then processed by the ADCs 84. For example, the SDS transceiver 12 may be configured to receive at a sample rate of 20 MHz. In this configuration, a decimation filter of 128 allows the reduction of noise, increased sensitivity and quantization, resulting in a sampling frequency of 156 or 250 kHz. Each FPGA 50 that is linked together over the feedback loop shown in FIG. 5 shares sampled information and can comprise a DDR memory (not shown) to store arrays of samples. The FPGAs 50 are thus performing time-delay beam forming, which may also be considered 2 medium access control (MAC) operations. In this example, the number of operations being performed is approximately 156.25 k samples/s*79 elements*80 beams*2=2 Million MAC operations per second. With every FPGA 50 performing 1 MAC operation in 1 cycle and running at 100 MHz, each FPGA 50 would be running 5 beam formers. Every beam former calculates a subset of the total number of beams and the first FPGA 50 behaves as a master to finalize the beam-forming of the other FPGAs 50. If every FPGA 50 stores data for 100 m of water column, approximately 156250*79*100/1500=1 Msamples per FPGA 50 would be required. The bandwidth used for communication would then be 5 beam formers*4 bytes*156250=3.2M bytes per second for each FPGA 50.

To perform stabilization in transmit and receive modes, the sensor module 26 can provide to the embedded PC 52, an update on pitch, roll and yaw of the transducer array 14. The embedded PC 52 can store an image of the geometry etc. of the transducer array 14 as well as sound velocity information measured from the transducer surface and provide periodically (e.g. every 20 ms), a new delay function table to all FPGAs 50 based on the new position of the vessel 20 and based on a new number of beams 22 that may be required to perform the selected function. The information used by the beam formers to delay the pilot signal to every element in the transmit mode also instructs a delay in the receive mode for each transducer element 112.

A Doppler profiler function 34 can be performed on the same data as obtained for the echosounder described above. Once the 80 beams are formed, the signal is inter-correlated to a pattern to improve signal to noise ratio (SNR) and resolution. The amplitude may then be used for the echosounder and the phase used to study the Doppler effect of the samples in the water column. The Doppler value is summed over several pings and filtered over several pings to get an average water backscattering that is strong enough to generate an echo return reflected by a target 23 in the water column.

To perform sub-bottom profiling generation, a parametric wave is created thus a two tone signal is transmitted, including a frequency component at, in this example 28 kHz and a second frequency at 34.5 kHz to create a secondary wave at 6.5 kHz that penetrates the seabed. The primary frequencies should be user selectable and such selection would generate the transmitted signal on the display unit 28, which is transmitted to the embedded PC 52 and the FPGA 50 for acoustic generation. In the receive mode, acoustic waves at 28 kHz, 34.5 kHz and 6.5 kHz in this example would be received, which allows a multi-frequency display.

Since virtually any waveform can be transmitted due to the configurability of the SDS transceiver 12, each pulse can contain coded information that is sent within a focused beam to an underwater vehicle via the modem 66. An example sequence involves sending 80 beams, locating the device to communicate with, track and focus the beam on the device and initiate a transfer of data to enable data to be carried to another location. It may be noted that stabilization and encryption techniques can be used to protect the transmission.

As discussed above, 80 beams in this example are generated from the transducer array 14 exemplified herein and the raw signal from each transducer element 112 can be treated to process the angle of arrival of the incoming signal. In this way, the transducer array 14 can be operated as a positioning device giving the bearing and target 23 of interest with a better resolution than the beam width itself.

It may also be noted that the FPGA 50 typically implements all bit streams required to cover all functions described above. As such, the FPGA 50 is typically chosen to be bigger than what is required for some operations, which allows the FPGA 50 to switch between functions quickly. The display unit 28 can provide an option to initiate functions serially or in parallel, which would then be sent to the SDS transceiver 12. For example, the echosounder and Doppler functions could be done simultaneously on the same data. Similarly, the echosounder and target tracking operations could be done simultaneously.

Figure 17:
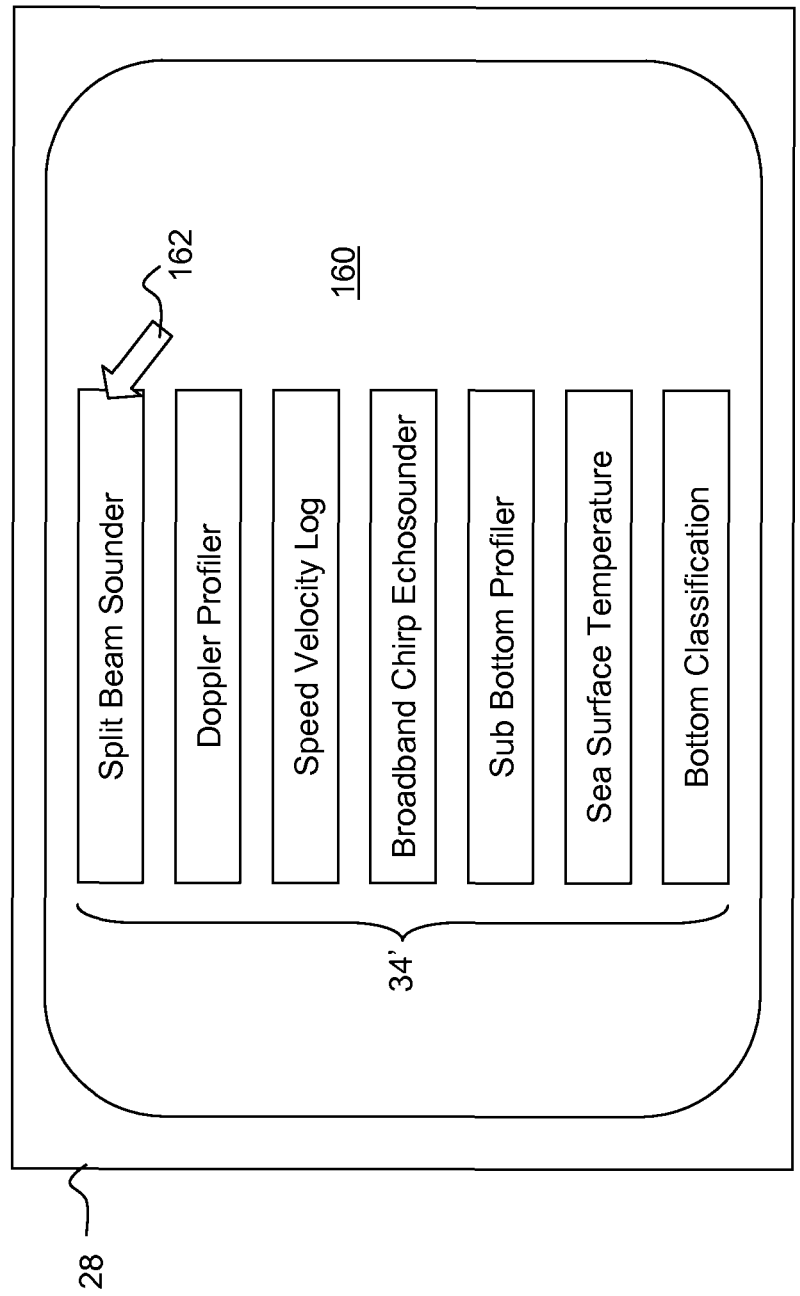
FIG. 17 is a schematic view of the display unit for the bridge computer showing a menu of options for multiple functions provided by the system.

Turning now to FIG. 17, an example user interface (UI) 160 is shown, which may be displayed by the display unit 28 on the bridge computer 16. The UI 160 in this example illustrates various selection icons 34' corresponding to the various functions that can be performed using the multi-function system 10 described herein. For example, a pointing device 162 can be controlled and focused on a desired icon 34' and that icon selected to initiate the desired function as outlined in FIG. 18.

In FIG. 18, at 200, the bridge software program 30 detects the selection of a function 34 and sends instructions to the embedded PC 52 at 202 to configure the SDS transceiver 12 accordingly. The SDS transceiver 12 then configures the FPGAs 50 according to the selected function 34 at 206 and the modules 55 generate the appropriate beam pattern at 208 by operating selected transducer elements 112 with appropriate time delays etc. The transmit signals drive the transducer elements 112 at 210 and the SDS transceiver 12 waits for the corresponding receive signals at 412. Fast processing is then performed on the FPGA 50 at 414 as discussed above and processed data is sent to the embedded PC 52 at 416. The embedded PC 52 then provides the data to the bridge computer 16 at 418 where it is displayed on the screen 28, mathematically processed, stored, etc. At 420, the bridge computer 16 determines if the same function 34 is to be used again for another cycle or if a new function 34 has been selected. If the same function is to be repeated, the process is repeated at 208. If a new function has been selected, the process may be repeated from 200.

As discussed above, various functions may be performed and interchangeability between such functions can be achieved on the fly using the system 10 described herein. FIG. 17 shows several example functions, including a split beam sounder, a Doppler profiler, a speed velocity log, a broadband chirp echosounder, a sub-bottom profiler, a sea surface temperature function and a bottom classification function. Each of these example functions 34 will be discussed below in the context of the example configurations described herein for illustrative purposes only. Following this discussion, various functions will be explained with respect to the configuration of the FPGAs 52 and the digital signal processing performed to illustrate examples of how to program these components to implement the functions 34 (FIGS. 19 through 32).

The split beam sounder utilizes the transducer array 14 to transmit 80 individual beams and receive in 4 quadrants for each beam (as seen in FIG. 16). The sounder's transmission pulse is applied to the whole transducer array 14. Target detection would then be determined by comparing the echo signals received by each quadrant. The signals received in each quadrant are then processed independently to determine the target strength directly from each echo.

With such split-beam capabilities, the system 10 can detect the shape and size of fish, fish schools and fish distribution with high discrimination and accuracy. The system 10 can use a histogram to provide fish size assessment of the target school. In addition, the system 10 can provide a fish distribution plot to display where the target fish are located within the detection area. By analyzing the size, volume and movement of a targeted fish school, operators can easily decide what to harvest and what to avoid. In this way, fisheries resource management is improved by avoiding schools with fish that are smaller than desired.

The system 10 can also provide improved detection zone coverage when compared to previous implementations. As an example, in a detection zone measuring 600 meters×600 meters at a reference bottom depth of 500 meters, the system 10 can achieve 100% coverage, whereas previous split beam sounders that transmit a single 7° beam typically provide only 1% detection coverage in the same geographic area. Also, split beam sounders that transmit five 7° beams only provide 5% target coverage in the same geographic area.

The system's transducer array 14, as noted above, can incorporate an integrated motion sensor 68 to reduce the loss of important targets 23 due to the ship's motion in rough seas. All beams can be maintained at a required tilt by compensating for the vessel's pitch (e.g. ±20°), roll (e.g. ±20°) and heave (e.g. ±100 m). The beam stabilizer can significantly improve target presentation by compensating for echogram distortion caused by the ship's motion. This provides an enhanced presentation of the echogram images even in rough seas, and improves measurement accuracy for fish size assessment display and target plot.

The system 10 can also be configured to incorporate a 3D A-Scope in the bridge software program 30 that can display historical echograms with amplitudes proportional to intensity. It also provides a wide variety of presentation modes in high resolution SXGA or XGA resolution, including split-beam, multi-beam, zoom, bottom lock, bottom zoom, fish histograms and distribution, bottom hardness, surface temperature and system status. The bridge computer 16 can also be configured to display inputs from other sensors and sounders.

In addition to standard continuous wave (CW) pulse modulation, the system 10 can utilize non-linear frequency modulation, known as a "chirp". A "chirp" is a signal modulation technique that's also used in military radar and spread spectrum communications. When used in commercial fishing applications, chirp modulation can significantly improve range resolution and enhance target discrimination when compared to conventional echosounders.

The system 10 can also incorporate a Doppler Profiler (DP) function 34 that measures water current velocities over a wide range of depths. The system 10 can readily interface to a vessel's GPS system to provide integrated velocity readings with precise position information. The system's multiple beam phased array design improves data reliability by providing a redundant data source in the case of a blocked or damaged beam. This also improves data quality by delivering an independent measurements known as error velocity and improves data accuracy. The transducer elements 112 can be aimed in such a way that the multi-frequency sound pulses travel through the water in different, but known directions. As the echo of the sound is returned by echo scatters in the water, it can be shifted in frequency due to the Doppler effect. The unit uses advanced DSP on the FPGAs 50 to deliver low-noise data, resulting in fine track resolution and accurate velocity profiles.

In addition to a vessel's speed and drift, the DP can continuously measure and display full water column profile velocities (current speed and direction) to a maximum depth of 1,000 meters below the vessel. Other displayed parameters include: current direction/speed, measured depth, ship speed relative to ground/ship course, ship speed relative to water/ship course, ahead-astern ship speed/starboard-port ship speed, absolute tidal current vector, relative tidal current vector, ship speed vector.

The system 10 can also function as an acoustic speed velocity log. The DCP in this case bounces sound pulses off the sea-bottom to determine the speed and direction velocity vector of the vessel 20 as it moves over the seafloor 24. The bottom-tracking capability has a range accuracy that can be equal to ±2% of the actual range. The DCP function can also incorporate electronic beam stabilization to reduce the effects of rolling, pitching and heaving motions.

The system 10 can also incorporate a broadband echosounder that utilizes advanced frequency modulation (CHIRP FM) and digital signal processing to provide significantly improved range resolution and superior target discrimination when compared to fixed-frequency echosounders. The system's software defined architecture enables digital signal processing to be performed in software which can be programmed "on-the-fly" to utilize any frequency, bandwidth, or pulse length.

In this configuration, the system 10 uses a non-linear FM (CHIRP) transmit pulse with correlation processing of the return signal. Instead of using a burst of a single carrier frequency, the frequency within the burst is swept over a broad range throughout the duration of transmission pulse. This creates a unique 'signature' pulse; the sounder knows what was transmitted and when. Using 'pattern-matching' techniques, the system 10 can look for its own unique signature being echoed back from targets 23. The response from the 'pattern-matching' algorithms in the echosounder results in longer transmissions and operating ranges without a loss in range resolution. CHIRP modulation also achieves superior signal to noise gain over a conventional echosounder used for commercial fisheries. This enables enhanced target detection and discrimination and is especially useful when trying to detect fish close to the bottom.

A robust, bottom tracking algorithm can be used to maintain bottom lock and delivers accurate depth over even the most difficult seabed topographies. The echosounder also incorporates a digital seabed classification system using well-proven techniques to rapidly characterize the seabed. Classification can be accomplished using the shape of the first returning echo from the seabed; different bottoms provide different acoustic signatures. Bottom types are organized into discrete units, thereby providing classification associated with the diversity of the seabed, incorporating both geological and biological features.

The system 10 can also be configured to include a sub-bottom profiler function 34 that operates in water depths from 20 m to 3,000 meters. The sub bottom profiler function is based on low frequency sound generation due to non-linear interaction in the water column from two high intensity sound beams at higher frequencies. The resulting signal has a high relative bandwidth (~80%), narrow beam profile (close to the transmitted high frequency signals) and essentially no small side lobes. All these features results in very high spatial resolution in the sediment profiles. The narrow beam results in lower received reverberation and higher penetration. The multi-element phased array transducer 14 enables the profiler to transmit a 30 kHz to 38 kHz pulse that is capable of penetrating the seabed and highlighting seismic structural differences and layers that are hidden from view to conventional echosounders. The system 10 can operate with various signal waveforms for optimum performance. Chirp pulses are used for deep water, high penetration work and CW pulses are used for narrow band, frequency sensitive work. The transmitted beam is electronically stabilized to ensure that the insonified area on the sea floor is accurately positioned. The unit can also use beam steering to cover a larger sector. This is of particular importance in object detection/location applications.

The bridge software program 30 can be programmed to use advanced algorithms for peak signal detection, receiver gain, bottom tracking, pulse length and power level controls to enhance accurate bottom detection/tracking. The program 30 can also be configured to be capable of providing high energy/wide bandwidth transmit waveforms and an advanced bottom triggered time variable gain (TVG) processing algorithm to facilitate both maximum bottom penetration along with high resolution layer definition. Sub bottom penetration performance depends on sediment characteristics, water depth, transmitted signature etc. Typical penetration of 30 meters can be achieved in water depths of 1000 meters.

Turning now to FIGS. 19 to 32, signal processing configurations for various applications that can be implemented by the SDS transceiver 12 are shown. FIGS. 19 to 22 illustrate signal processing configurations for implementing a chirp echosounder function 34. An echosounder transmits an acoustic signal toward the sea bottom and receives the backscattered echo. The result is an amplitude of the received signal in dBVolt that can be displayed on the bridge computer 16. The strength of the echo depends on the characteristics of the reflectors, e.g. the reflection is generally more powerful on the sea bottom than on a fish. When implementing a processing configuration for an echosounder, the objective is to determine the target strength of the reflector that provides the received echo.

FIG. 19 illustrates one configuration for a chirp echosounder wherein a bandpass filter stage 350 is performed at the FPGA 50 and a correlation and envelope detection stage 352 is offloaded to the embedded PC 52. A dB stage 354 and TVG stage 356 are then performed on the bridge computer 16. The dB stage 354 converts the signal into decibels and the TVG stage 356 compensates for different distances caused by spreading of the signal in the water, to obtain the same signal strength for a target 23 regardless of the distance. The application of TVG algorithms are well known in the sonar art and thus further details thereof can be omitted. FIG. 20 illustrates another configuration for a chirp echosounder wherein the filter stage 350 and detection stage 352 are both performed on the FPGA 50. Therefore, the various functional stages can be programmed to be performed at either the FPGA 50 or the embedded PC 52 which allows flexibility to adapt to different applications.

Figure 21:
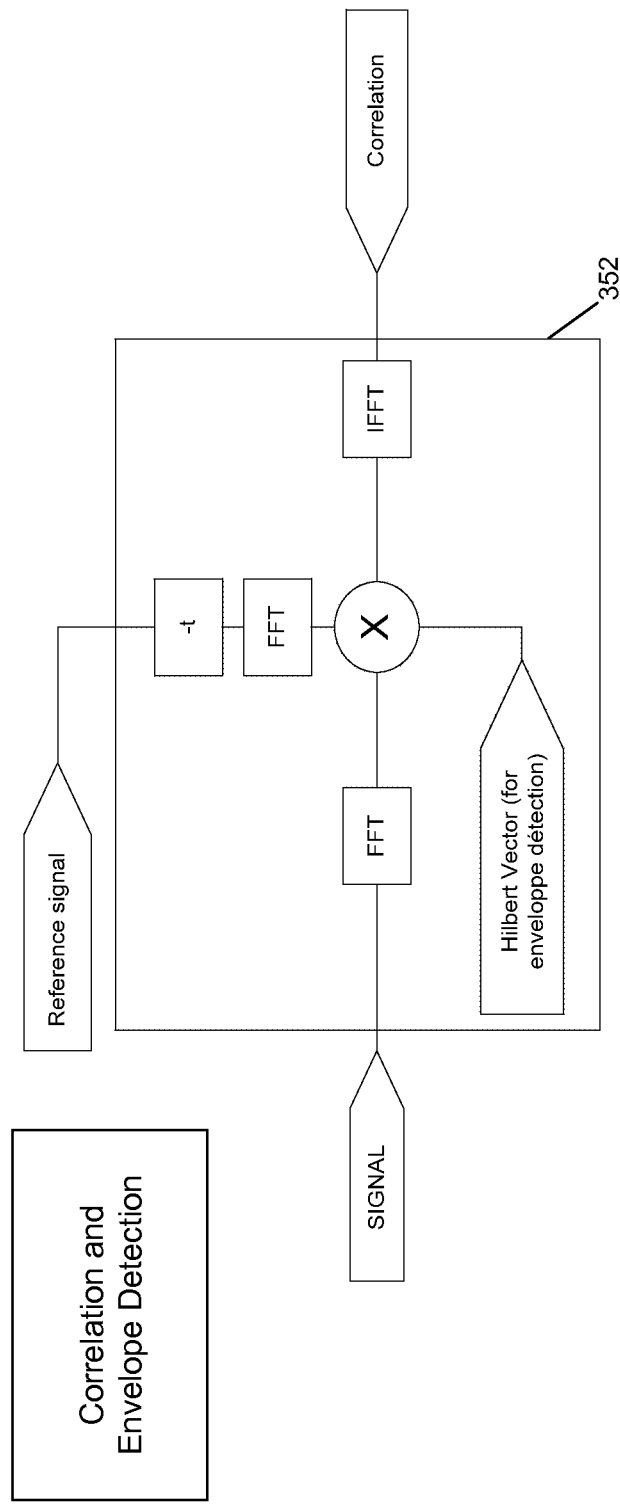
FIG. 21 is a block diagram showing further detail of the correlation and envelope detection block shown in FIGS. 19 and 20.
Figure 22:
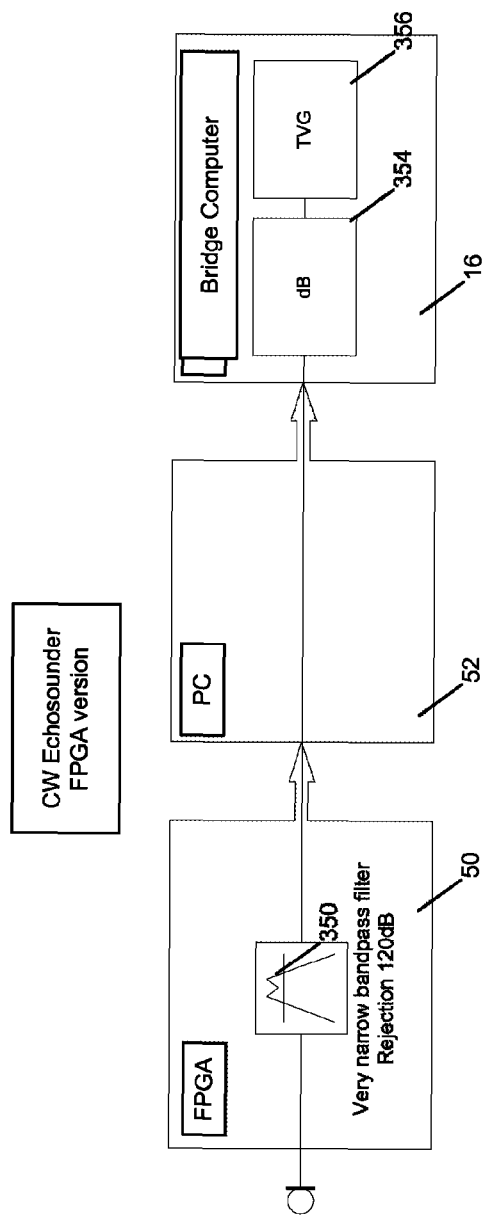
FIG. 22 is a block diagram showing an exemplary configuration for a continuous wave (CW) echosounder function.

An example configuration for the correlation and envelope detection stage 352 is shown in FIG. 21. In this configuration, the signal is multiplied by an expected reference signal and a stored Hilbert Vector (with the appropriate Fourier transforms and inverse operations computed), to obtain the correlation, as is well known in the art. FIG. 22 illustrates a configuration for a CW echosounder wherein the bandpass filter stage 350 is performed at the FPGA 50 and the correlation stage 352 is not required. However, it may be noted that the correlation stage 352 can still be used in the CW embodiment, i.e. by applying an expected CW reference signal, e.g. if it is advantageous to use the same software code or modules.

Figure 23:
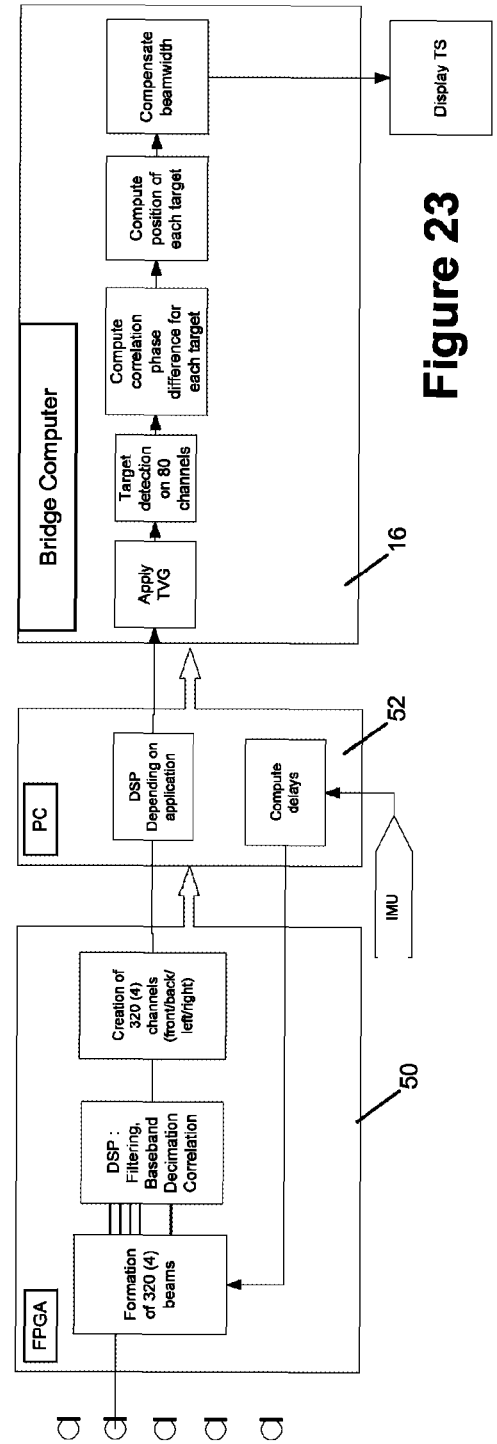
FIG. 23 is a block diagram illustrating a configuration of the system for a beam forming receive process with split-beam analysis.

FIG. 23 illustrates a configuration for performing a beam forming receive operation with split-beam analysis. In this example, the FPGA 50 creates between 4 and 320 beams from signals received from the transducers, depending on the nature of the transducer array 14. The formation of the beams takes into account delays that are computed at the embedded PC 52, based on information provided by a motion sensor unit (IMU). For example, the delays may be precomputed in order to perform complementary delays on the received signals as a result of beam steering or beam focusing. The beams which have been formed from the received signals, and having delays applied thereto, are provided to an internal DSP for performing filtering and baseband decimation correlation for reducing the amount of data to be dealt with by the system 10, and to only keep the useful bandwidth of the signal. From the DSP, a set of channels are created by dividing each beam into 4 sub-beams. The sub-beams are grouped into four quadrants and channels are formed by associating quadrants, namely to create front, back, left and right channels as explained below. In the result, 320 channels are created and sent to the embedded PC 52 for digital signal processing if required by the particular application.

The channels are then sent to the bridge computer 16, wherein a TVG stage is performed, followed by target detection on 80 channels. In this example, 80 beams are shown, each beam being split into 4 (i.e. 320 beams processed). The target information of every beam is processed, and an additional angle is calculated by the split beam, and then the target can be located inside each of the 80 beams. This is an interpolation to improve location detection of the isolated target. The sub-beams are added by pairs of 2 to form part of the antenna. When a target 23 is detected in the echogram, the phase difference of the echo on 2 beams gives the angle of arrival. Since the depth is known, the full position of the target 23 within the beam can be ascertained. For each transducer element 112, the received beam is grouped into 4 quadrants and channels are formed by associating quadrants For each target 23, a correlation phase difference is computed and then the position of each target 23 is computed. A beam width compensation procedure is then performed and the signals then displayed.

Two processes will now be described for performing a split beam echogram. In the first process, one correlation is performed on the identified target 23. This makes it possible to adjust the length of the correlation on target characteristics. In the second process, the correlation is done early in the treatment of the signal, in the FPGA 50, all along the echogram, and target detection is done later.

In the first process, standard echo sounder processing is performed on the 4 beams (including carrier removal and filtering) and the beams are then grouped in pairs as noted above, to form the channels. Target detection is then determined on at least 1 channel (i.e. the process determines in which one or more quadrants the target 23 is found). This provides a list with sample location of the beginning of the detected target 23, and the length in the sample of the target 23. The algorithm to detect the target 23 works similar to bottom detection, except that targets 23 are expected to be there for a short time, and have a signal strength that is lower than the bottom.

For each target 23, the distance is measured with time elapsed since transmission, and angular position is given with 2 angles: along front/back axis; and along left/right axis. This provides a full 3D position of each target 23. With angular position, the target strength of each target 23 is compensated with the 2 way beam pattern of the transducer element 112.

In the second process, the echogram received from the SDS transceiver 12 is used to perform beam correlation and beam averaging upon receipt. The result of the beam correlation can then be stored for eventual use in a target positioning sub-process. As can be appreciated, the flexibility of the SDS transceiver 12 as discussed above, enables various configurations to be implemented from the same platform.

Figure 24:
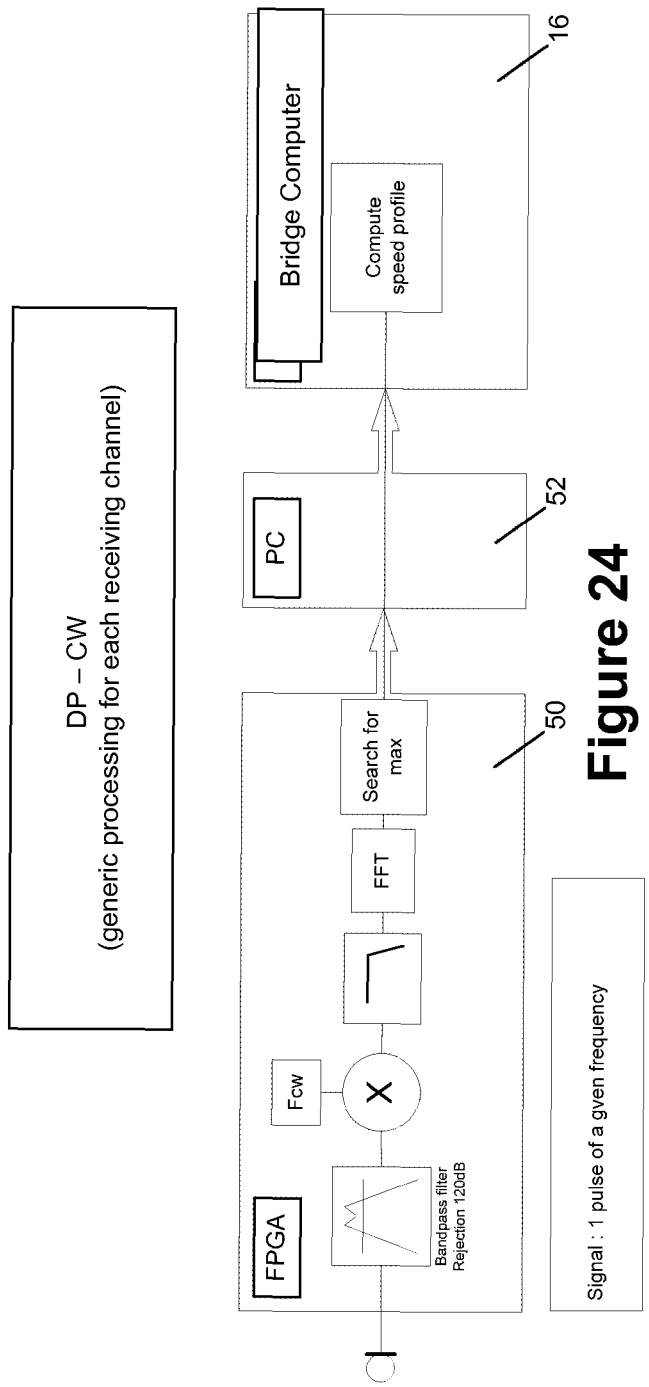
FIG. 24 is block diagram illustrating an exemplary configuration for performing a CW Doppler profile (DP).

Turning now to FIG. 24, signal processing for another function, namely the Doppler Profiler (DP) is shown which illustrates that using the system 10, the same hardware can be used to implement different software functions. In the DP, the purpose is to transmit a pulse in the water and observe the Doppler effect on the returned signal. The Doppler frequency shift is due to the relative speed between the antenna and the water or sea bottom. The measurement of boat speed relative to the bottom is done in what is called Doppler Velocity Log (DVL). FIG. 24 illustrates an exemplary configuration for performing a CW DP. At the FPGA 50, a bandpass filter is applied and a demodulation at Fcw is performed followed by a low-pass filter and an FFT. The FPGA 50 then searches for maximum amplitude in the frequency domain, which provides the frequency shift i.e. Doppler related to speed of the target in the layer of concern. From this, the bridge computer 16 then computes the speed profile.

Figure 25:
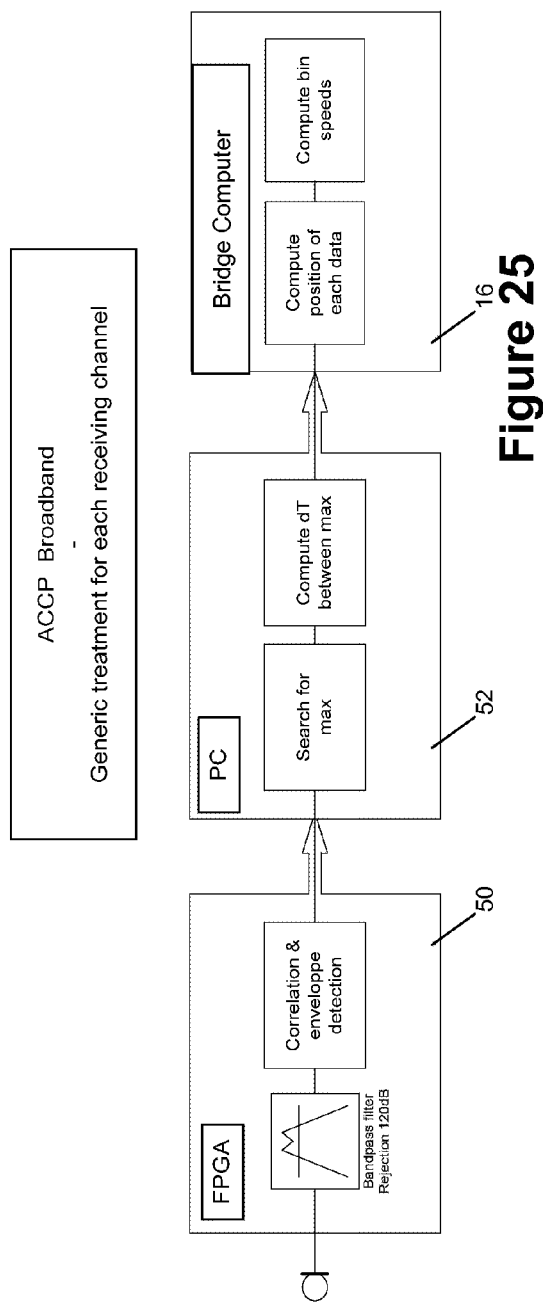
FIG. 25 is a block diagram illustrating an exemplary configuration for performing an acoustic correlation current profiler (ACCP) function.

Turning next to FIG. 25, yet another function is exemplified, namely an Acoustic Correlation Current Profiler (ACCP) which, like the DP, provides a profile of the current in the water column, but instead of looking for a frequency shift, it looks for a time shift between two very close pulses. The measure of the time shift is made by correlating the pulses. To enhance the precision of the correlation, the pulses can be made broadband. In FIG. 25, it may be noted that in this example, the signal comprises a pulse train composed of 2 short broadband pulses with precise delta between them. As shown, the FPGA 50 performs a bandpass filtering stage and a correlation and envelope detection stage, the embedded PC 52 performs a search stage for the maximum in the signal and computes the delta (dT) in time, which can be converted in speed, since the time from transmit is known. In this way, movement of target is then determined. The result is then sent to the bridge computer 16, where the position of each datum is computed and the bin speeds are then computed.

Figure 26:
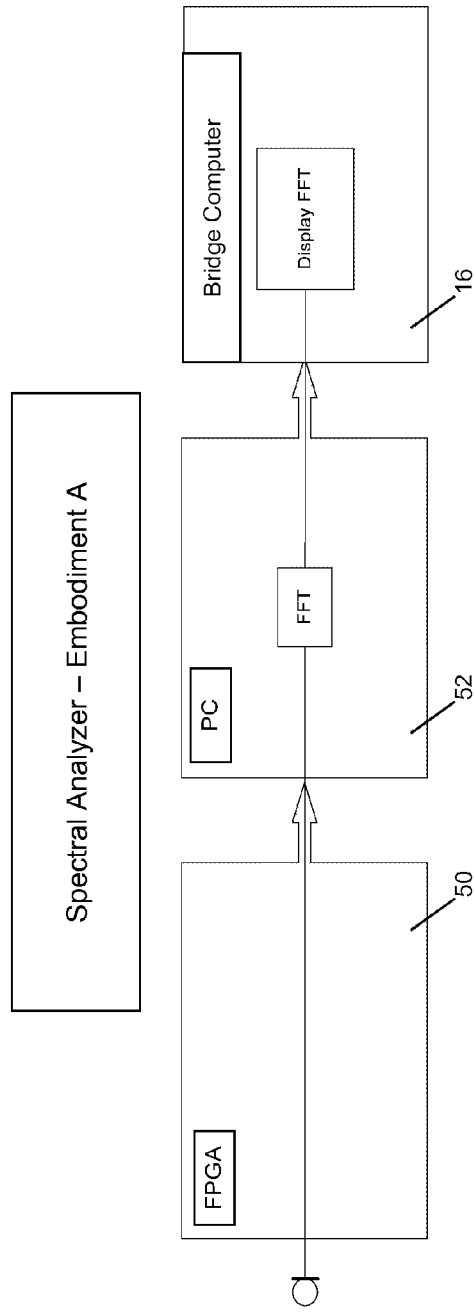
FIG. 26 is a block diagram illustrating one embodiment for implementing a spectral analyzer function.

FIGS. 26 and 27 illustrate two embodiments for performing spectral analyses. The spectral analyzer is a tool that computes the FFT of the signal that arrives on the ADC 84 and sends the spectrum of the signal to the display. The length of the FFT should be user configurable to adapt it to any need. In embodiment A shown in FIG. 26, the FFT is performed on the embedded PC 52 and the FFT displayed on the bridge computer 16. In embodiment B shown in FIG. 27, the signal is first demodulated at a given frequency by the FPGA 50, then the FFT computed. This provides a good resolution on a small part of the spectrum without a large FFT. The width of the spectrum depends on the sampling frequency: SpecWidth=SamplingFreq/2. The size of the FFT depends on the frequency resolution of interest: FreqResolution=2*SpecWidth/FFTLength. In FIG. 27, it may be noted that the low pass filter is used to suppress the multiples of the demodulation frequency Fcw, which typically requires that: Fcw<cutoff frequency<2*Fcw.

FIG. 28 illustrates a configuration for performing a Multi-Angle Swath Bathymetry (MASB) function 34. The MASB function 34 computes sides-can sonar data using interferometry between elements of the transducer array 14 to provide full 3D positioning of each backscattered datum. As shown, the filtering is performed by the FPGA 50 and the MASB process is performed by the embedded PC 52 in this example. Display and tracking algorithms are then performed by the bridge computer 16. For a CW signal, the bandpass filter is a linear phase filter that is centered at the carrier frequency and has a width equal to the inverse of the pulse length, which implements an approximate matched filter, e.g. an FIR filter. The demodulation frequency Fcw is the pulse carrier frequency in this example, and as for the spectral analyzer, the low pass filter is used to suppress multiples of Fcw after demodulation. To compensate for computation delays (if experienced), a portion of the MASB process can be performed on the FPGA 50.

FIGS. 29 to 32 illustrate exemplary configurations of the system 10 for beam forming and beam steering. To transmit or receive a signal in a specific direction, one possibility is to have the transducer element 112 pointing in the intended direction, which is typically done in some DPs with 4 transducers pointing in the four quadrants. However, it has been recognized that to be more flexible, the transducer array 14 can be used to provide one large flat antenna and the beams steers virtually in any direction of interest. To point the transmitted signal in a specific direction, a specific delay is applied to each transducer element 112 of the antenna being used at that particular time.

Depending on the application, there can be four modes. The first mode is to receive and transmit on 1 beam. This can be used for a stabilized echosounder with the possibility to focus the beam to the front of the boat, making a forward looking echosounder, and to use forward/down transmit simultaneously. Another application for the first mode is a stabilized bottom profiler. The number of transducer elements 112 used to form a beam depends on the width/power compromise desired for the beam. Table 1 below illustrates various beam widths possible based on the number of elements.

TABLE 1

Beamwidth Sample Specifications

| Number of elements | −3 dB beamdwidth/FOM | | |
|---|---|---|---|
| | 28 kHz | 40 kHz | 70 kHz |
| 1 | /−35 dB | 38°/−30 dB | /−55 dB |
| 7 | /−25 dB | 30°/−20 dB | /−45 dB |
| 79 | 7°/−10 dB | 5°/−5 dB | 3°/−35 dB |

Typically, for fishing echosounder and bottom profiler applications, it is best to have a narrow and powerful beam and thus, according to the above table, 79 elements should be used. Up to 79 delays would need to be computed for beam steering based on pitch, roll, yaw, and desired angle of emission. Up to 79 delays would need to be computed for beam forming, also based on pitch, roll, yaw, and desired angle of emission.

The second mode comprises receiving and transmitting on 1 beam that scan the space. One application for such a mode is a stabilized DP wherein the transmission is done either in 3 directions alternatively, or in 4 directions that can (or may not) be grouped into twos. Reception is then done simultaneously in the 3 or 4 directions. Another application of the second mode is a stabilized multi beam echosounder, wherein a beam scans the water below the boat circularly. Using current capabilities, one circle typically should not exceed 5 s for a revolution for good refreshing of data. Signals used in each direction should have minimal cross-correlation.

The third mode comprises a wide transmit and 80 narrow simultaneous receives. An application for such a mode is in a stabilized multi-beam echosounder wherein the transmit is done with 7 elements to have a wide insonifying beam, and the receive is done simultaneously on 80 narrow beams made of 79 elements. For this, 79 delays would be needed for beam steering and 79*80 delays would be needed for beam forming, both based on pitch, roll, yaw, and desired angle of emission.

The fourth mode comprises a sequenced transmit and 80 simultaneous receives. One application for this mode is a stabilized multi beam echosounder with increased power, in particular on the edge of the beam. The transmit is done on 80 beams of 79 elements with 1 ms signal every 2 ms. The receive portion is performed simultaneously on 80 beams of 79 elements. The signals transmitted should be designed to minimize cross-correlation.

Figure 29:
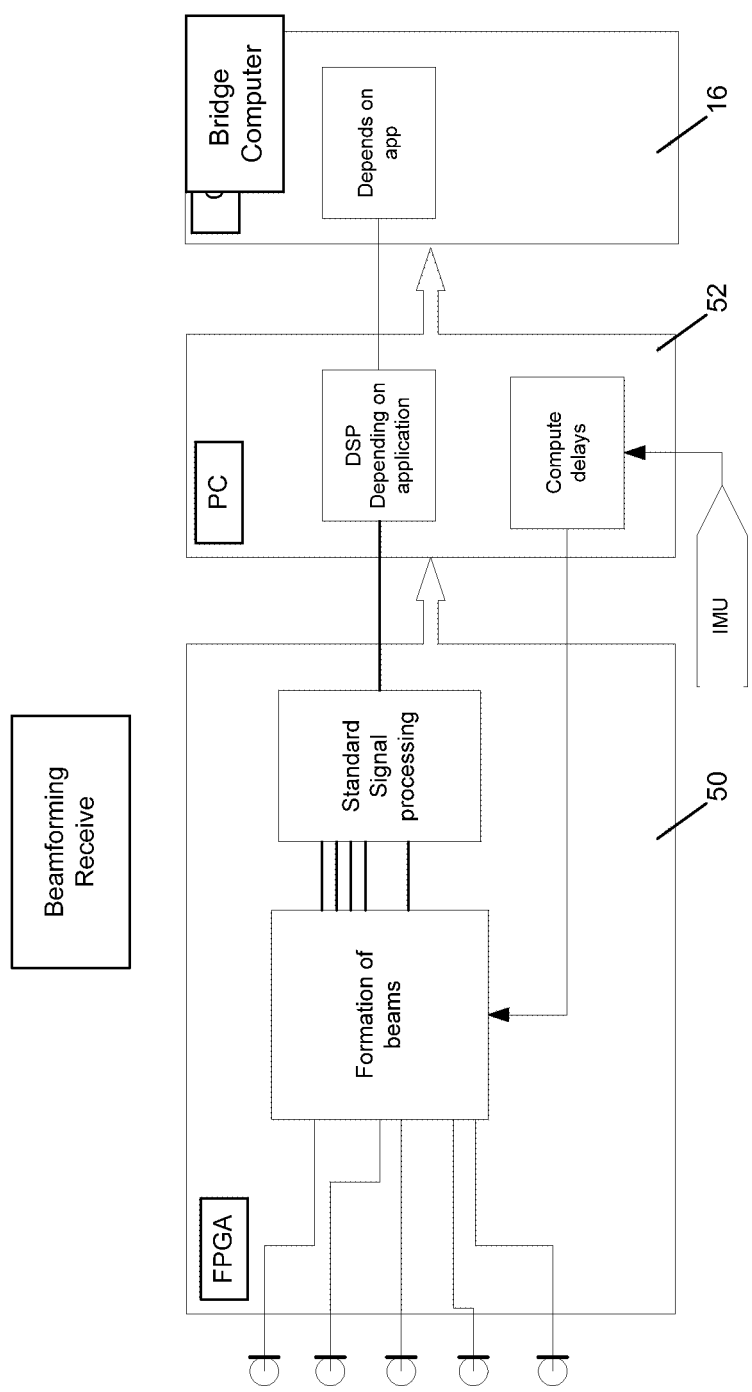
FIG. 29 is a block diagram illustrating an exemplary configuration for performing a beam forming receive operation.
Figure 30:
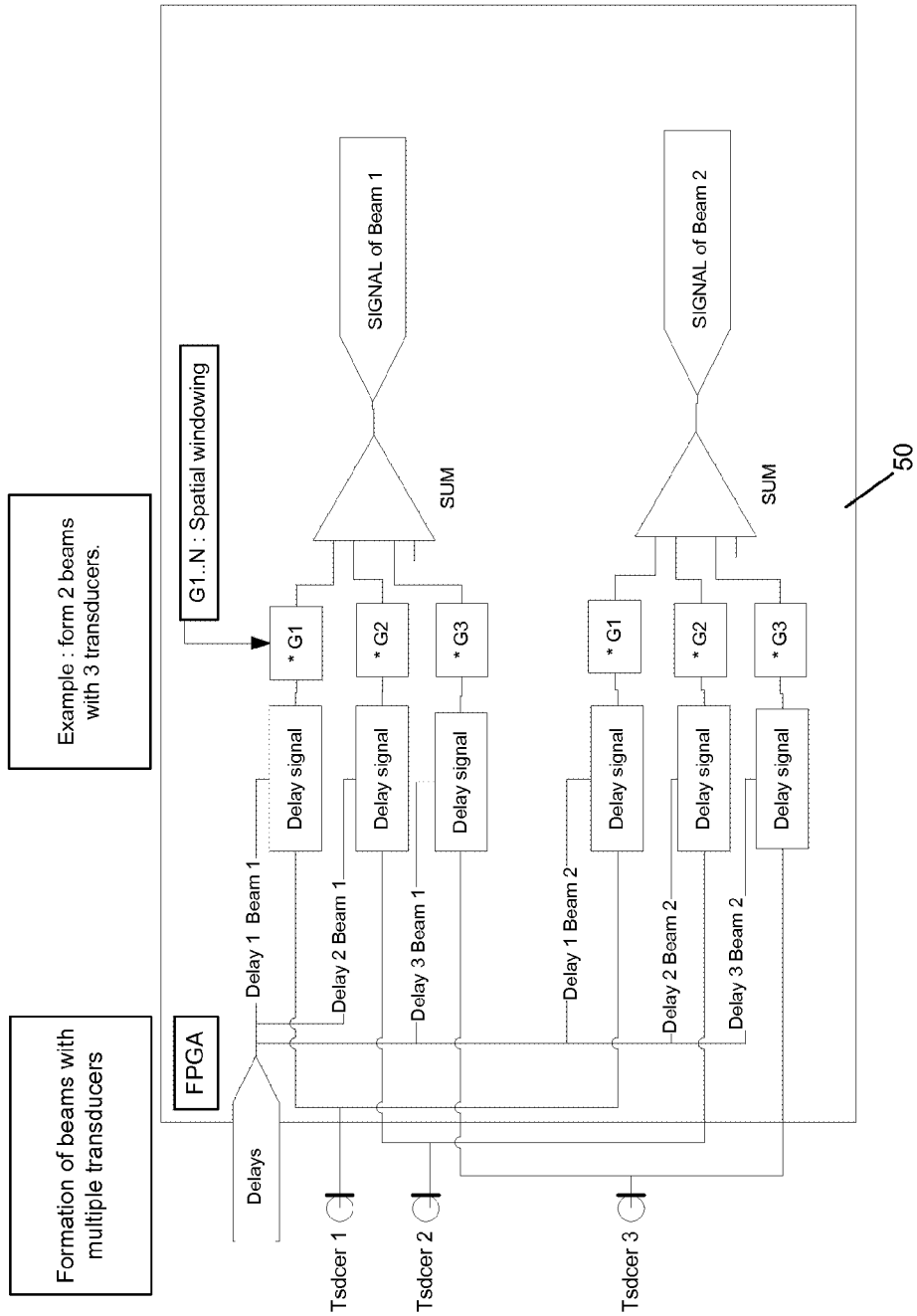
FIG. 30 is a block diagram illustrating further detail of the beam formation occurring at the FPGA in FIG. 29.

A processing configuration for the beam forming receive function is shown in FIG. 29 and the formation of the beams with multiple transducers is shown in FIG. 30. Referring to FIG. 29, the formation of the beams based on the signals received from the transducer elements 112 is performed on the FPGA 50 using the delays computed on the embedded PC 52 as discussed above. Standard signal processing is also performed on the FPGA 50 and DSP is performed in the embedded PC 52, depending on the application. The processing performed at the bridge computer is dependent on the application. FIG. 30 shows an example for forming 2 beams from 3 transducer signals. In this example, the signal from each of transducers 1, 2, and 3 are fed to a delay signal block for each beam and the delays are applied to each signal for that beam. Spatial windowing is then applied to each delayed signal and the resultant signals are summed to generate beam 1 and beam 2 as shown.

It may be noted that the maximum difference between 2 elements of the antenna is: $dl=L*\sin(\theta)$. Hence, the maximum delay is: $dt=dl/c=L*\sin(\theta)/c$; with: $\theta<30°$ (at 30°, we have 8 dB attenuation), $c=1500$ m/s, and $L=40$ cm. Also, we have $dt<133$ us*2=266 us (*2 because max dt is between +30° and −30°).

When considering the necessary precision on delay, it may be noted that the maximum precision of pitch and roll can be worse than 0.1°. A 30° delay is given by: $dt=L*(\sin(30+\text{AngleStep})-\sin(30))/c$. Between two adjacent elements, $L=4.5$ cm. For AngleStep=0.1°, we have $dt=45$ ns. For AngleStep=1°, we have $dt=451$ ns. Given that the sampling freq of ADC is 2.5 Ms/s, that is 400 ns sampling period, delays can be multiples of the sampling frequency. Therefore, the number of samples to be stored for delay is 266 us/406 ns=665 sple.

Figure 31:
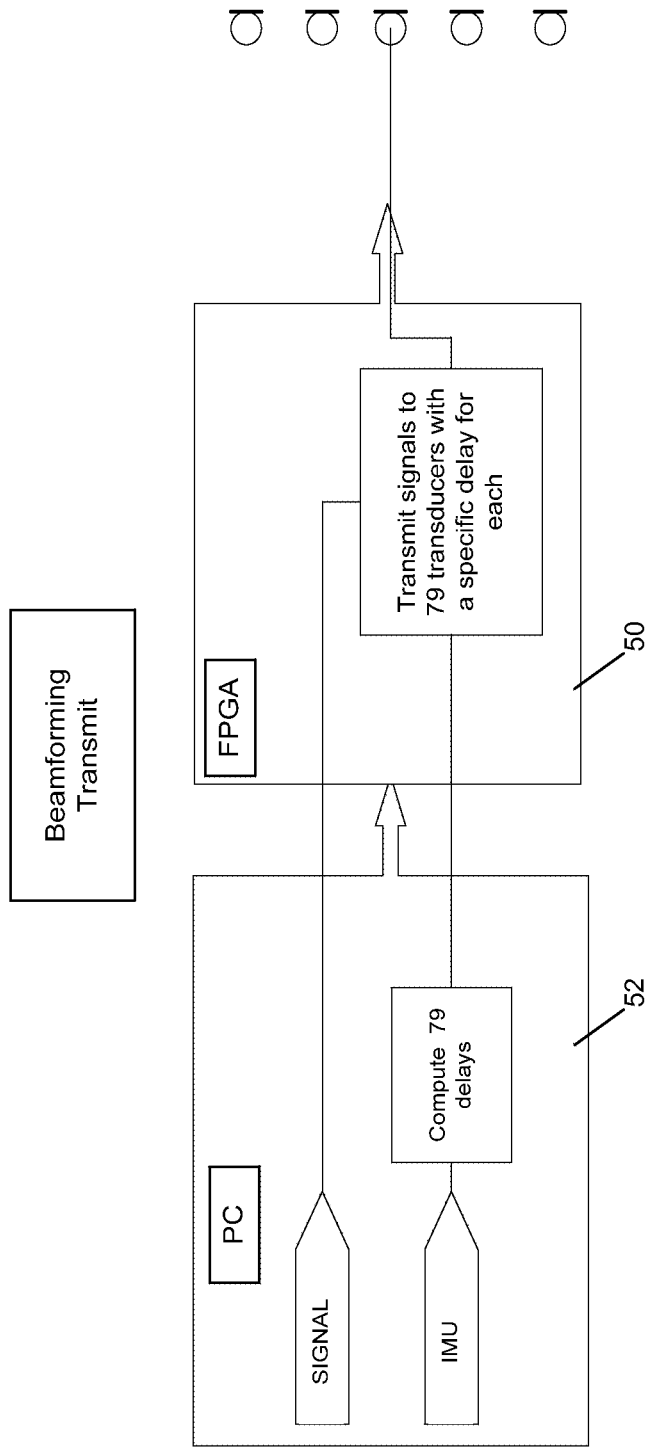
FIG. 31 is a block diagram illustrating an exemplary configuration for performing a beam forming transmit operation.
Figure 32:
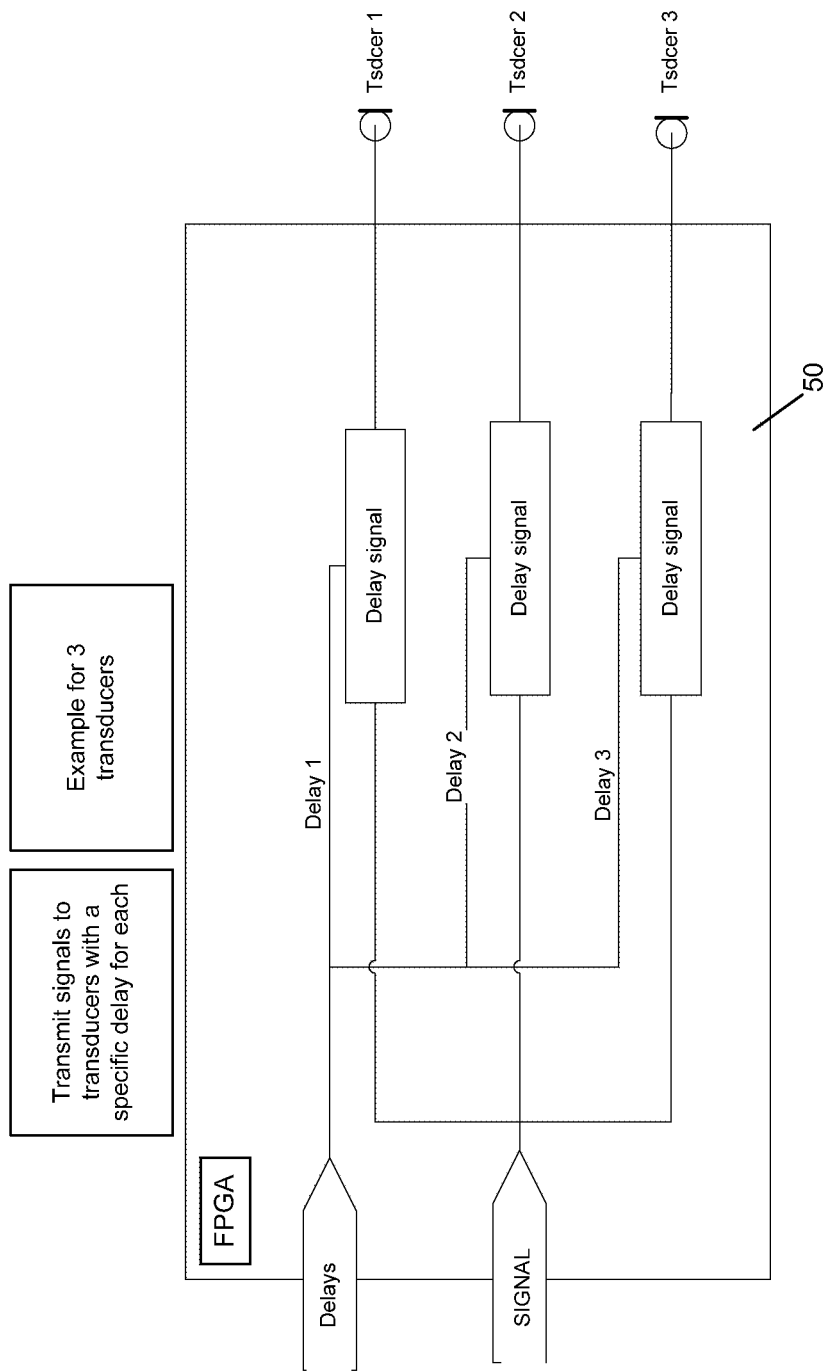
FIG. 32 is a block diagram illustrating further detail of the application of signal delays in the FPGA shown in FIG. 31.

FIGS. 31 and 32 illustrate an example configuration for conducting a beam forming transmit operation. In FIG. 31 it can be seen that the signal to be transmitted, along with the delays, are provided by the embedded PC 52 to the FPGA 50. The FPGA 50 then transmits the signals to the 79 transducers in this example, with a specific delay for each. FIG. 32 illustrates greater detail of the operations performed in the FPGA 50 for 3 transducers (for ease of illustration). As shown, the signal is applied to three separate signal delay blocks, each applying a different delay for each corresponding transducer element 112.

It can therefore be seen that by utilizing a software defined platform with a broadband phased array transducer 14, a configurable, multi-function sonar system can be provided to enable various subsea acoustic systems to be achieved in a single configurable unit thus reducing the space required on the vessel 20 and the cost of having such multiple functions.

The system 10 described above mitigates the need for fixed software and hardware embodied in separate units for performing multiple subsea acoustic functions by providing a configurable software defined platform 12, 12' that facilitates "on-the-fly" flexibility with a common set of hardware. The software defined platform 12, 12' operates in conjunction with a broadband phased array transducer 14 in order to provide a broadband of frequencies to accommodate various functions such as a split-beam sounder, Doppler profiler, sub bottom profiler and many more. The array 14 utilizes a large set of individual transducer elements 112 to enable dynamic beam forming and beam steering for long-range detection of targets 23 and currents. Also provided is a sensor module situated directly in/on the transducer array to provide beam-stabilization using direct feedback obtained from the actual movements of the array. In this way, the system can adapt to and compensate for changing environments.

Although the above description has been made with reference to certain specific embodiments, various modifications thereof will be apparent to those skilled in the art as outlined in the claims appended hereto.

What is claimed is:

1. A system for performing multiple subsea acoustic applications comprising: a broadband transducer comprising a plurality of transducer elements operated by a configurable software defined transceiver, said transceiver comprising at least one programmable device capable of being configured via software instructions and a plurality of channels corresponding to said transducer elements controlled by at least one transmit/receive switch to route said channels to respective ones of said transducer elements according to a selected one of said applications.

2. The system according to claim 1 further configured for receiving an update for reconfiguring or switching between functions or to perform firmware upgrades, sync data, download data or perform a data transfer task required by said desired application.

3. The system according to claim 1 further comprising a security chip comprising an encryption engine and a secret key, said security chip configured for: receiving encrypted firmware for programming said at least one programmable device; using said encryption engine and said secret key to decrypt said firmware; and running said firmware; wherein said firmware will not run if said secret key is not correct.

4. The system according to claim 1 further comprising a sensor module, said sensor module comprising one or more sensors, said software defined transceiver being configured for: receiving one or more sensor measurements from said sensor module; and using said sensor measurements to control signals routed to and received by said transducer elements.

5. The system according to claim 1 wherein said at least one programmable device comprises a stack of a plurality of units each having a field programmable gate array (FPGA) and transmit and receive channels to create enough channels according to the number of said transducer elements.

6. The system according to claim 5, wherein one of said units comprises a single clock source shared by all of said units to create a master/slave relationship to enable a master FPGA to synchronize transmit and receive operations for every channel.

7. The system according to claim 1 further comprising dividing functions performed by said software defined transceiver between said at least one programmable device and an embedded computer provided to offload intensive processing from said programmable device and to enable connection of external devices.

8. The system according to claim 1 wherein said desired application comprises a chirp echosounder application.

9. A method for dynamically performing one of a plurality of subsea acoustic applications using a common software defined sonar platform, said method comprising: detecting selection of a desired one of said subsea acoustic applications; providing instructions for implementing said desired application; programming at least one programmable device using said instructions to configure a transceiver to control a plurality of channels for corresponding transducer elements to route signals on said channels to respective ones of said transducer elements according to signal processing required for said desired application.

10. The method according to claim 9 further comprising receiving an update for reconfiguring or switching between functions or to perform firmware upgrades, sync data, download data or perform a data transfer task required by said desired application.

11. The method according to claim 9 further comprising receiving at a security chip, encrypted firmware for programming said at least one programmable device; using an encryption engine and a secret key in said security chip to decrypt said firmware; and running said firmware; wherein said firmware will not run if said secret key is not correct.

12. The method according to claim 9 further comprising receiving one or more sensor measurements from a sensor module; and using said sensor measurements to control said signals routed to said transducer elements.

13. The method according to claim 9 wherein said at least one programmable device comprises a stack of a plurality of units each having a field programmable gate array (FPGA) and transmit and receive channels to create enough channels according to the number of said transducer elements.

14. The method according to claim 13, wherein one of said units comprises a single clock source shared by all of said units to create a master/slave relationship to enable a master FPGA to synchronize transmit and receive operations for every channel.

15. The method according to claim 9 further comprising dividing functions performed by said software defined sonar platform between said at least one programmable device and an embedded computer provided to offload intensive processing from said programmable device and to enable connection of external devices.

16. A computer readable medium comprising one or more sets of computer executable instructions for dynamically performing one of a plurality of subsea acoustic applications using a common software defined sonar platform, said one or more sets of computer executable instructions comprising instructions for implementing the method according to claim 9.

17. The method according to claim 9 wherein said desired application comprises a chirp echosounder application.

* * * * *